(12) United States Patent
Gray et al.

(10) Patent No.: US 11,009,394 B2
(45) Date of Patent: May 18, 2021

(54) MULTISPECTRUM SUPER RESOLUTION MICROSCOPY

(71) Applicant: OREGON HEALTH & SCIENCE UNIVERSITY, Portland, OR (US)

(72) Inventors: Joe Gray, Lake Oswego, OR (US); Summer Dowell, West Linn, OR (US); Xiaolin Nan, Lake Oswego, OR (US); Steven Jacques, Ayer, MA (US); Don Kania, Ashland, OR (US)

(73) Assignee: OREGON HEALTH & SCIENCE UNIVERSITY, Portland, OR (US)

( * ) Notice: Subject to any disclaimer, the term of this patent is extended or adjusted under 35 U.S.C. 154(b) by 99 days.

(21) Appl. No.: 16/347,027

(22) PCT Filed: Nov. 2, 2017

(86) PCT No.: PCT/US2017/059708
§ 371 (c)(1),
(2) Date: May 2, 2019

(87) PCT Pub. No.: WO2018/085531
PCT Pub. Date: May 11, 2018

(65) Prior Publication Data
US 2019/0271592 A1    Sep. 5, 2019

Related U.S. Application Data

(60) Provisional application No. 62/417,133, filed on Nov. 3, 2016.

(51) Int. Cl.
*G01J 3/02*        (2006.01)
*G01J 3/14*        (2006.01)
(Continued)

(52) U.S. Cl.
CPC ........... *G01J 3/0291* (2013.01); *G01J 3/0205* (2013.01); *G01J 3/14* (2013.01); *G01N 21/6428* (2013.01);
(Continued)

(58) Field of Classification Search
CPC ..................................................... G02B 21/18
See application file for complete search history.

(56) References Cited

U.S. PATENT DOCUMENTS 5,329,352 A    7/1994  Jacobsen
5,442,438 A    8/1995  Batchelder et al.
(Continued)

FOREIGN PATENT DOCUMENTS

JP     201522070 A    2/2015
WO    2017027818     2/2017

OTHER PUBLICATIONS

Zhengyang Zhang et al.; Ultrahigh-throughput single-molecule spectroscopy and spectrally resolved super-resolution microscopy; Nature America, Inc. vol. 12 No. 10, pp. 935-940; Oct. 2015.
(Continued)

*Primary Examiner* — Shawn Decenzo
(74) *Attorney, Agent, or Firm* — Niels Haun; Dann, Dorfman, Herrell & Skillman, P.C.

(57) ABSTRACT

Devices, systems, reagents, and methods for the performance of multi-spectrum super resolution microscopy are disclosed.

17 Claims, 29 Drawing Sheets

(51) Int. Cl.
| | |
|---|---|
| *G01N 21/64* | (2006.01) |
| *G01N 21/84* | (2006.01) |
| *G02B 21/16* | (2006.01) |
| *G02B 21/18* | (2006.01) |
| *G02B 27/58* | (2006.01) |
| *G01J 3/18* | (2006.01) |

(52) U.S. Cl.
CPC ..... *G01N 21/6458* (2013.01); *G01N 21/8483* (2013.01); *G02B 21/16* (2013.01); *G02B 21/18* (2013.01); *G02B 27/58* (2013.01); *G01J 3/18* (2013.01); *G01N 2021/6441* (2013.01); *G01N 2201/066* (2013.01)

(56) References Cited

U.S. PATENT DOCUMENTS

| | | | |
|---|---|---|---|
| 6,255,646 | B1 | 7/2001 | Shimada |
| 6,717,668 | B2 | 4/2004 | Treado |
| 2002/0085809 | A1* | 7/2002 | Nakama ............... G02B 6/4215 385/37 |
| 2014/0333750 | A1* | 11/2014 | Zhuang ................. G02B 27/58 348/79 |
| 2015/0146278 | A1* | 5/2015 | Thomas ............. G02B 21/0076 359/292 |
| 2015/0346101 | A1 | 12/2015 | Zhao |
| 2017/0251191 | A1* | 8/2017 | Huang ............... G02B 21/0032 |
| 2018/0038787 | A1* | 2/2018 | Salazar ................ G01N 33/246 |
| 2018/0275060 | A1* | 9/2018 | Xu ...................... G02B 21/367 |
| 2019/0235219 | A1* | 8/2019 | Peng .................... G02B 27/58 |

OTHER PUBLICATIONS

Paul M. Lundquist et al.; Parallel confocal detection of single molecules in real time; Optics Letters, vol. 33, No. 9 pp. 1026-1028; May 1, 2008.
Takanobu Haga et al.; Prism-based Spectral Imaging of Four Species of Single-molecule Fluorophores by Using One Excitation Laser; Springer Science+Business Media New York 2013, J Fluoresc (2013) 23:591-597.
Biqin Dong et al: "Super-resolution spectroscopic microscopy via photon localization", Nature Communications, vol. 7, Jul. 25, 2016 (Jul. 25, 2016), p. 12290.
Michael J. Mlodzianoski et al: "Super-Resolution Imaging of Molecular Emission Spectra and Single Molecule Spectral Fluctuations", PLOS ONE, vol. 11, No. 3, Mar. 22, 2016 (Mar. 22, 2016), p. e0147506.
Internation Search report and Written opinion dated May 8, 2018 for Corresponding Application PCT/US17/59708.
'C-mounted Plate Beamsplitters', Edmund Optics, online shopping catalog, Jun. 11, 2012 (Jun. 11, 2012). [available online at https:f/ web.archive .org/web/20120611073045/http:/lwww .edmundoptics. com:80/optics/beamspli tters/plate-beamsplitters/c-mounted-plate-beamsplitters/2084; accessed Mar. 29, 2018 (Mar. 29, 2018)).
European Search Report dated May 19, 2020 from Corresponding Application EP 17866873.7.
Betzig, E. et al. Imaging intracellular fluorescent proteins at nanometer resolution. Science 313, 1642-1645, doi:10.1126/science. 1127344 (2006).
Hess, S. T., Girirajan, T. P. & Mason, M. D. Ultra-high resolution imaging by fluorescence photoactivation localization microscopy. Biophys J 91, 4258-4272, doi:10.1529/biophysj.106.091116 (2006).
Rust, M. J., Bates, M. & Zhuang, X. Sub-diffraction-limit imaging by stochastic optical reconstruction microscopy (STORM). Nat Methods 3, 793-795, doi:10.1038/nmeth929 (2006).
Heilemann, M. et al. Subdiffraction-resolution fluorescence imaging with conventional fluorescent probes. Angew Chem Int Ed Engl 47, 6172-6176, doi:10.1002/anie.200802376 (2008).
Dempsey, G. T., Vaughan, J. C., Chen, K. H., Bates, M. & Zhuang, X. Evaluation of fluorophores for optimal performance in localization-based super-resolution imaging. Nat Methods 8, 1027-1036, doi:10. 1038/nmeth.1768 (2011).

Jones, S. A., Shim, S. H., He, J. & Zhuang, X. Fast, three-dimensional super-resolution imaging of live cells. Nat Methods 8, 499-508, doi:10.1038/nmeth.1605 (2011).
Manley, S. et al. High-density mapping of single-molecule trajectories with photoactivated localization microscopy. Nat Methods 5, 155-157, doi:10.1038/nmeth.1176 (2008).
Xu, K., Zhong, G. & Zhuang, X. Actin, spectrin, and associated proteins form a periodic cytoskeletal structure in axons. Science 339, 452-456, doi:10.1126/science.1232251 (2013).
Shroff, H. et al. Dual-color superresolution imaging of genetically expressed probes within individual adhesion complexes. Proc Natl Acad Sci U S A 104, 20308-20313, doi:10.1073/pnas.0710517105 (2007).
Bates, M., Huang, B., Dempsey, G. T. & Zhuang, X. Multicolor super-resolution imaging with photo-switchable fluorescent probes. Science 317, 1749-1753, doi:10.1126/science.1146598 (2007).
Pereira, P. M., Almada, P. & Henriques, R. High-content 3D multicolor super-resolution localization microscopy. Methods Cell Biol 125, 95-117, doi:10.1016/bs.mcb.2014.10.004 (2015).
Bates, M., Dempsey, G. T., Chen, K. H. & Zhuang, X. Multicolor super-resolution fluorescence imaging via multi-parameter fluorophore detection. Chemphyschem 13, 99-107, doi:10.1002/cphc. 201100735 (2012).
Gunewardene, M. S. et al. Superresolution imaging of multiple fluorescent proteins with highly overlapping emission spectra in living cells. Biophys J 101, 1522-1528, doi:10.1016/j.bpj.2011.07. 049 (2011).
Lampe, A., Haucke, V., Sigrist, S. J., Heilemann, M. & Schmoranzer, J. Multi-colour direct STORM with red emitting carbocyanines. Biol Cell 104, 229-237, doi:10.1111/boc.201100011 (2012).
Jungmann, R. et al. Multiplexed 3D cellular super-resolution imaging with DNA-PAINT and Exchange-PAINT. Nat Methods 11, 313-318, doi:10.1038/nmeth.2835 (2014).
Lundquist, P. M. et al. Parallel confocal detection of single molecules in real time. Opt Lett 33, 1026-1028 (2008).
Cutler, P. J. et al. Multi-color quantum dot tracking using a high-speed hyperspectral line-scanning microscope. PLoS One 8, e64320, doi:10.1371/journal.pone.0064320 (2013).
Haga, T., Sonehara, T., Fujita, T. & Takahashi, S. Prism-based spectral imaging of four species of single-molecule fluorophores by using one excitation laser. J Fluoresc 23, 591-597, doi:10.1007/ s10895-013-1208-8 (2013).
Broeken, J., Rieger, B. & Stallinga, S. Simultaneous measurement of position and color of single fluorescent emitters using diffractive optics. Opt Lett 39, 3352-3355, doi:10.1364/OL.39.003352 (2014).
Zhang, Z., Kenny, S. J., Hauser, M., Li, W. & Xu, K. Ultrahigh-throughput single-molecule spectroscopy and spectrally resolved super-resolution microscopy. Nat Methods 12, 935-938, doi:10. 1038/nmeth.3528 (2015).
Thompson, R. E., Larson, D. R. & Webb, W. W. Precise nanometer localization analysis for individual fluorescent probes. Biophys J 82, 2775-2783, doi:10.1016/S0006-3495(02)75618-X (2002).
Lehmann, M., Lichtner, G., Klenz, H. & Schmoranzer, J. Novel organic dyes for multicolor localization-based super-resolution microscopy. J Biophotonics 9, 161-170, doi:10.1002/jbio.201500119 (2016).
Ries, J., Kaplan, C., Platonova, E., Eghlidi, H. & Ewers, H. A simple, versatile method for GFP-based super-resolution microscopy via nanobodies. Nat Methods 9, 582-584, doi:10.1038/nmeth. 1991 (2012).
Persson, F., Linden, M., Unoson, C. & Elf, J. Extracting intracellular diffusive states and transition rates from single-molecule tracking data. Nat Methods 10, 265-269, doi:10.1038/nmeth.2367 (2013).
Mlodzianoski, M. J., Curthoys, N. M., Gunewardene, M. S., Carter, S. & Hess, S. T. Super-Resolution Imaging of Molecular Emission Spectra and Single Molecule Spectral Fluctuations. PLoS One 11, e0147506, doi:10.1371/journal.pone.0147506 (2016).
Klymchenko, A. S. & Mely, Y. Fluorescent environment-sensitive dyes as reporters of biomolecular interactions. Prog Mol Biol Transl Sci 113, 35-58, doi:10.1016/B978-0-12-386932-6.00002-8 (2013).
Frigault, M. M., Lacoste, J., Swift, J. L. & Brown, C. M. Live-cell microscopy—tips and tools. J Cell Sci 122, 753-767, doi:10.1242/ jcs.033837 (2009).

(56) References Cited

OTHER PUBLICATIONS

English, B. P. & Singer, R. H. A three-camera imaging microscope for high-speed single-molecule tracking and super-resolution imaging in living cells. Proc SPIE Int Soc Opt Eng 9550, 955008, doi:10.1117/12.2190246 (2015).
Kusumi, A., Tsunoyama, T. A., Hirosawa, K. M., Kasai, R. S. & Fujiwara, T. K. Tracking single molecules at work in living cells. Nat Chem Biol 10, 524-532, doi:10.1038/nchembio.1558 (2014).
Dietrich, C., Yang, B., Fujiwara, T., Kusumi, A. & Jacobson, K. Relationship of lipid rafts to transient confinement zones detected by single particle tracking. Biophys J 82, 274-284, doi:10.1016/S0006-3495(02)75393-9 (2002).
Katz, Z. B. et al. Mapping translation 'hot-spots' in live cells by tracking single molecules of mRNA and ribosomes. Elife 5, doi:10.7554/eLife.10415 (2016).
Nickerson, A., Huang, T., Lin, L. J. & Nan, X. Photoactivated localization microscopy with bimolecular fluorescence complementation (BiFC-PALM) for nanoscale imaging of protein-protein interactions in cells. PLoS One 9, e100589, doi:10.1371/journal.pone.0100589 (2014).
Edelstein, A., Amodaj, N., Hoover, K., Vale, R. & Stuurman, N. Computer control of microscopes using microManager. Curr Protoc Mol Biol Chapter 14, Unit14 20, doi:10.1002/0471142727.mb1420592 (2010).
Nickerson, A., Huang, T., Lin, L. J. & Nan, X. Photoactivated Localization Microscopy with Bimolecular Fluorescence Complementation (BiFC-PALM). J Vis Exp, e53154, doi:10.3791/53154 (2015).
Schindelin, J. et al. Fiji: an open-source platform for biological-image analysis. Nat Methods 9, 676-682, doi:10.1038/nmeth.2019 (2012).

\* cited by examiner

1: CF633; 2: CELL MASK DR; 3: CF680R

HORIZONTAL DISPERSION

VERTICAL DISPERSION

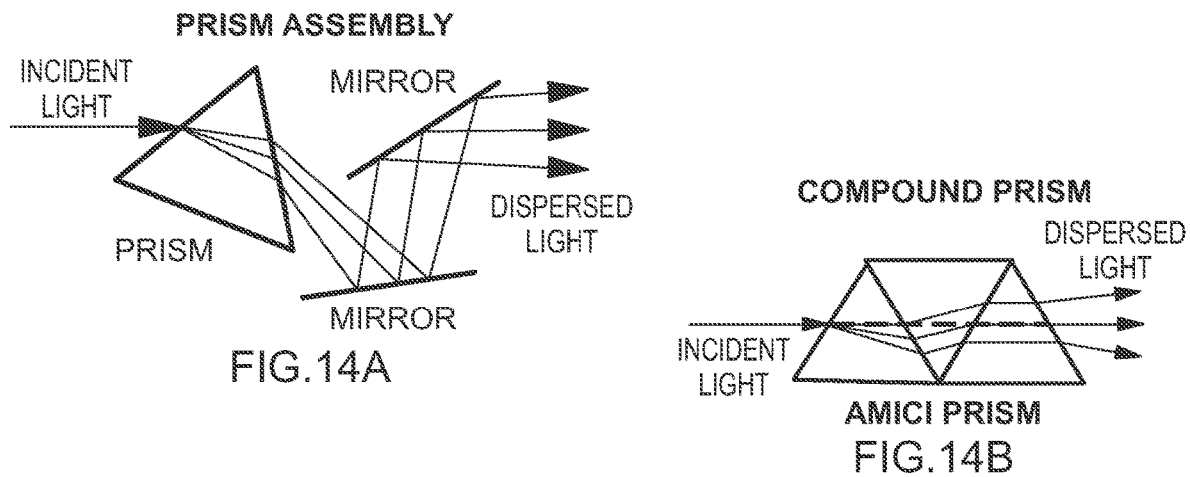
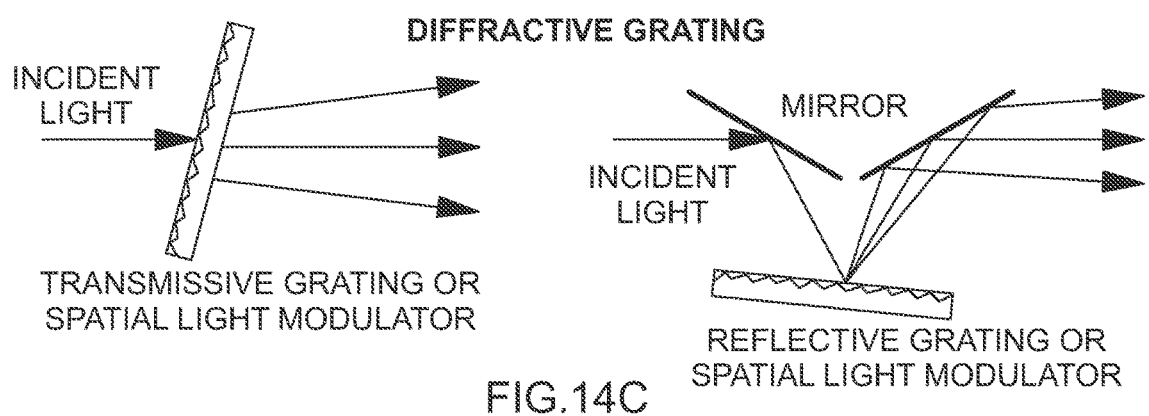
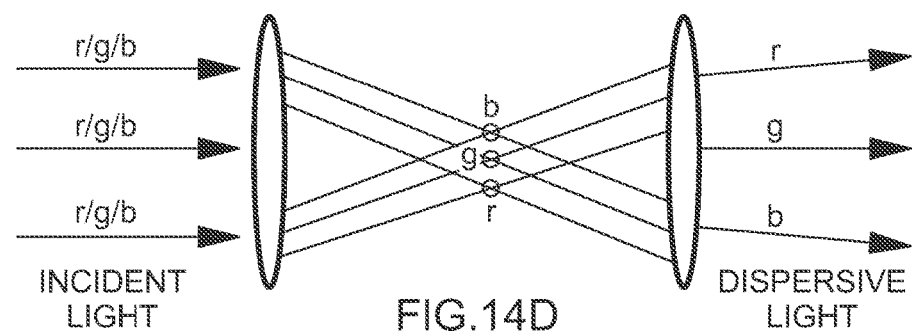

MULTISPECTRUM SUPER RESOLUTION MICROSCOPY

RELATED APPLICATIONS

This application is a 371 application of International Application No. PCT/US17/59708 filed Nov. 2, 2017, which claims the benefit of priority of U.S. Provisional Application No. 62/417,133 filed on Nov. 3, 2016, the entire contents of which application(s) are incorporated herein by reference.

FIELD

Generally, the field relates to fluorescence microscopy. More specifically, the field relates to multispectral super resolution microscopy of live cells.

BACKGROUND

Super-resolution imaging with single-molecule localization microscopy (SMLM) is based on the principle that images of fluorescently stained samples can be constructed with nanometer spatial resolution by accumulating sub-diffractive localizations of individual fluorophores over time as they stochastically turn on and off. Initial SMLM techniques designated (fluorescence) PhotoActivated Localization Microscopy ((f)PALM) (Betzig E et al, Science 313, 1642-1645 (2006); and Hess S T et al, Biophys J 91, 4258-4272 (2006); both of which are incorporated by reference herein) and (direct) Stochastic Optical Reconstruction Microscopy ((d)STORM) (Rust M J et al, Nat Methods 3, 793-795 (2006) and Heilemann M et al, Angew Chem Int Ed Engl 47, 6172-6176 (2008); both of which are incorporated by reference herein) both take advantage of this approach. Fluorophores suited for SMLM exhibit efficient photoswitching and moderate to high single-molecule photon output per switching cycle for precise localization in a densely labeled sample (Dempsey G T et al, Nat Methods 8, 1027-1036 (2011); incorporated by reference herein). SMLM in both fixed and live cells (Jones S A et al, Nat Methods 8, 499-508 (2011); incorporated by reference herein), as well as single-molecule tracking (SMT) in live cells based on SMLM principles Manley S et al, Nat Methods 5, 155-157 (2008); incorporated by reference herein) are now well established to allow analysis of static and dynamic molecular structures that previously could not be resolved.

SMLM becomes especially powerful if multiple molecular species or structures can be imaged simultaneously (Xu K et al, Science 339, 452-456 (2013); Shroff H et al, Proc Natl Acad Sci USA 104, 20308-20313 (2007); Bates M et al, Science 317, 1749-1753 (2007); and Pereira P M et al, Methods Cell Biol 125, 95-117 (2015); incorporated by reference herein). Currently, however, SMLM is practically limited to 3-4 colors at maximum since fluorophores used for staining have emission spectra that extend over 50-100 nm (Bates M et al, Chemphyschem 13, 99-107 (2012); incorporated by reference herein). As a consequence, dyes separated in emission wavelength by 50-100 nm are chosen so that their signals can be cleanly separated with emission filters. Even with sophisticated optical setups and image processing algorithms, spectral crosstalk remains significant and non-negligible for biological applications (Gunewardene M S et al, Biophys J 101, 1522-1528 (2011) and Lampe A et al, Biol Cell 104, 229-237 (2012); both of which are incorporated by reference herein). This limitation can be overcome using multiple rounds of labeling, for example through DNA-PAINT (Jungmann R et al, Nat Methods 11, 313-318 (2014); incorporated by reference herein), to increase the number of colors. However these techniques require specialized labeling reagents and time-consuming serial staining and so are not compatible with live cell imaging. Additionally, these approaches typically require multiple lasers, each exciting one fluorophore, thus complicating the imaging scheme and potentially harming living specimens.

Another strategy to achieve multicolor SMLM, which is just starting to be exploited, is to distinguish fluorophores based on their spectral signatures instead of using emission filters. This strategy requires recording molecular positions and spectra at once. Initially this was achieved using confocal (Lundquist P M et al, Opt Lett 33, 1026-1028 (2014); incorporated by reference herein) or line scanning (Cutler P J et al, PLoS One 8, e64320 (2013); incorporated by reference herein) schemes, but both are generally too slow for practical SMLM. Sonehara et al. introduced a prism-based wide field single-molecule spectral imaging scheme to obtain the emission spectra of all fluorescent molecules in the field of view at once; the fluorophores were attached to gold nanoparticles and the fluorophore positions were obtained by imaging the nanoparticles separately. While the authors were able to distinguish 4 fluorophores (emission maxima between 540 and 620 nm), this approach is still not practical for SMLM (Haga T et al, J Fluoresc 23, 591-597 (2013); incorporated by reference herein). In 2014, Broeken and colleagues used a spatial light modulator to disperse a fluorescent signal from single emitters for simultaneous recording of positions and spectra, where the zeroth order diffraction records the position and distance between zeroth and first order spots correspond to the emission wavelength. This eliminated the use of separate positional markers, but the effective spectral resolution of this approach was only ~50 nm (Broeken J et al, Opt Lett 39, 3352-3355 (2014); incorporated by reference herein).

More recently, Zhang et al., introduced a promising multicolor form of SMLM called spectrally-resolved stochastic optical reconstruction microscopy, or SR-STORM, which uses two opposing objectives in a wide-field imaging scheme (Zhang Z et al, Nat Methods 12, 935-938 (2015); incorporated by reference herein). Single molecule images collected by one objective are used to determine the positions of fluorophores in the field of view, and images collected by the other objective are dispersed by a prism so that the emission spectra of the same fluorescent molecules can be determined. This approach was used to acquire 4-color images of fixed cells using 4 fluorophores with highly overlapping emission spectra. The SR-STORM achieved a nominal spectral resolution around ~10 nm additionally to a spatial resolution of 20-50 nm. This is a significant improvement in spectral resolution over previously reported SMLM. However, the use of two opposing, high numerical aperture objectives requires that the sample be tightly sandwiched between two cover glasses. This space constraint poses severe challenges to sample loading, and it is difficult to apply to live-cell imaging where the cells need to be maintained under physiological conditions with incubation chambers. In addition, it is difficult to implement in commercial high-resolution microscopes since these typically use a single-objective, inverted configuration.

SUMMARY

Super-resolution microscopy and single-molecule tracking are powerful tools for biological research, but multicolor experiments have been difficult due to spectral crosstalk between fluorophores. Disclosed herein is a simple-to-use multispectral super-resolution microscope (MSSRM) wherein fluorescence signals from the field of view may be collected using a single objective and split between positional and spectral channels; each molecule may generate two images—a positional image for spatial localization and a spectral image for fluorophore identification. Many fluorophores possess optimal photo-physical properties for both precise localization and reliable spectral identification as single molecules. The disclosed MSSRM can acquire 4-color super-resolution images in fixed cells and perform 3-color single-molecule tracking in living cells, both using spectrally proximal fluorophores that can be excited with a single laser. The live-cell compatibility, spatial and spectral resolution and simplicity afforded by the MSSRM in accordance with the present invention make it a powerful and versatile tool for biological imaging.

Disclosed herein is a set of microscopy configurations for simultaneous measurement of the position and the emission spectra of all the single-fluorescent molecules located in the field of view in a wide-field imaging setting. These include exemplary configurations in accordance with the present invention that yield a positional image and a spectral image of each fluorescent molecule in the field of view; the precise localization of the fluorescent molecule and its emission spectrum can be determined by combining the two images. One such configuration is a single objective microscope (FIG. 1A, 12A), comprising: a beam splitter configured to split a light signal into a first portion and a second portion, direct the first portion to a positional lens and direct a second portion of the light signal to a spectral lens; a dispersion element (e.g. a prism assembly, FIG. 1A, 14A, 14B) positioned between the beam splitter and the spectral lens, said prism assembly comprising an equilateral prism and at least two mirrors, where said prism assembly is mounted to a translational stage; and a knife edge mirror positioned between the positional lens and the spectral lens. The microscope can further comprise a first lens configured to direct the light signal to the beam splitter. The first portion can comprise about 30% of the light signal and the second portion can comprise about 70% of the light signal. The microscope can further comprise a side port, said side-port comprising a mirror and a tube lens. The microscope can further comprise an on-stage incubator configured to maintain live cells in culture.

Alternatively, instead of using a beam splitter to divide the signal into two image channels, the internal image splitting mechanisms of most commercial, inverted microscope frames (such as a Nikon Ti-U or Zeiss Axiovert Observer SD, for example) can be utilized to divert the signal into two different image ports (e.g. left and right ports of 20% and 80% signals), with one port dedicated to acquiring a positional image and the other port to acquiring a spectral image (e.g., FIG. 12C). This configuration makes use of the multiple image ports on a commercial microscope without needing additional beam splitting optics or the associated alignment steps. Importantly, commercial microscope frames allow easy switch from a left:right signal ratio to other ratios such as 100%:0%, in which case the left channel is the only channel in use and the microscope reverts back to a conventional super-resolution microscope. The microscope can further comprise an on-stage incubator to maintain live cells in culture.

A third exemplary implementation of the positional and spectral channel configuration in accordance with the present invention is the use of a dual-objective microscope, comprising: two objectives including an upper and a lower objective, where either or both can be used to illuminate the sample and both are used to collect signals from the sample (FIG. 12B). Signals going to the two objectives yield two detection channels, the upper and the lower channels, respectively. A pair of lenses may be placed in a 4f configuration with a slit placed at the intermediate image plane. A dispersion element (e.g. a prism assembly) positioned in one channel (e.g. the lower channel), designated as the spectral channel, after the second lens and optionally mounted to a translational stage. A third lens in each channel is then used to re-form the images. A knife edge mirror positioned between the positional lens and the spectral lens combines the positional and the spectral images onto the same detector. The microscope can further comprise a first lens configured to direct the light signal to the beam splitter. The first portion can comprise about 30% of the light signal and the second portion can comprise about 70% of the light signal. The microscope can further comprise a side port, said side-port comprising a mirror and a tube lens. (FIG. 12B)

An example data set with both the positional (left) and the spectral images side-by-side is shown in FIG. 12D. In certain exemplary aspects of the present invention configurations (FIGS. 13A-13C) may be provided that yield dual spectral images for each fluorescent molecule in the field of view, based on which the precise position of the molecule and its emission spectrum can also be determined. Similar to what has been described for the positional and spectral combinations, there are three potential configurations that can achieve dual spectral imaging. First, a single-objective microscope with a beam splitter (FIG. 13A). Second, a single-objective microscope without a beam splitter, where signal splitting is through built-in signal diversion prisms inside commercial microscopes, such as the Nikon Ti-U (FIG. 13C). Third, a dual-objective configuration (FIG. 13B).

Thus, in one of its aspects the present invention may provide a microscope apparatus for simultaneous measurement of positional-spectral or spectral-spectral information of a sample, comprising collection optics for receiving a light signal from a sample, the collection optics configured to create a first optical path having a first light signal and a second optical path having a second light signal; a first dispersion element disposed in the first optical path to disperse the first light signal into a first spectrum; and a detector for receiving the spectrum from the first optical path and light from the second optical path. The collection optics may include an objective lens and a beam splitter disposed between the objective lens and the dispersion element, the beam splitter configured to divide light received thereby into the first and second optical paths. The beamsplitter may be configured to divide the light into a first portion of about 70% in the first optical path and a second portion of about 30% in the second optical path. The collection optics may include a first objective lens disposed in the first optical path for receiving a light signal from the sample, and the collection optics may include a second objective lens disposed in the second optical path at a location for receiving a light signal from the sample. The collection optics may include left and right microscope image ports, and the image ports may be configured to divide the light into a first portion of about 70-80% in the first optical path and the remaining 30-20% in the second optical path. A knife-edge mirror may be disposed between the dispersion element and the detector, and the knife-edge mirror positioned to receive the spectrum from the first optical path and light from the second optical path and to reflect the received spectrum and light to the detector.

A second dispersion element may be disposed in the second optical path to disperse light received thereby into a second spectrum, and a knife-edge mirror may be disposed between the first and second dispersion elements and the detector, and be positioned to receive the first and second spectra and to reflect the received spectra onto the detector. The position information of the sample may be determined using the spectral information received by the detector. The first and second dispersion element may be oriented to disperse the first and second spectra in opposite directions. The first and second dispersion elements may be oriented to disperse the first and second spectra in directions that are perpendicular to one another. A pair of lenses may be disposed between the collection optics and the first dispersion element, the pair of lenses placed in a 4f configuration with a slit placed at the intermediate image plane between the lenses. The slit may have a longitudinal axis and the first dispersion element may be oriented to disperse the first light signal along a direction parallel to the longitudinal axis.

At least one of the first and second dispersion elements may include a prism assembly comprising an equilateral prism and at least two mirrors in optical communication with the prism. Further, at least one of the first and second dispersion elements may include a diffraction grating. At least one of the first and second dispersion elements may include a diffraction grating and at least two mirrors in optical communication with the grating.

In another of its aspects the present invention may provide, a method of imaging live cells, the method comprising providing a microscope apparatus as described above; and labeling a first biomarker with a first reagent and a second biomarker with a second reagent, where the first reagent comprises a first fluorescent label and the second reagent comprises a second fluorescent label, and where the first fluorescent label and the second fluorescent label are all excitable by light of the same wavelength and emit light at a wavelength distinguishable from one another.

Also disclosed herein is a method of imaging live cells, the method comprising: labeling a first biomarker with a first reagent, a second biomarker with a second reagent, and a third biomarker with a third reagent, where the first reagent comprises a first fluorescent label, where the second reagent comprises a second fluorescent label, and the third reagent comprises a third fluorescent label, and where the first fluorescent label, the second fluorescent label, and the third fluorescent label are all excited by light of the same wavelength and emit at a wavelength distinguishable from one another. The first fluorescent label, the second fluorescent label and the third fluorescent label can be selected from the fluorophores shown in FIG. 7 herein. The first fluorophore can comprise CF633, the second fluorophore can comprise CellmaskDR™, and the third fluorophore can comprise HT-CF680R.

BRIEF DESCRIPTION OF THE DRAWINGS

The foregoing summary and the following detailed description of exemplary embodiments of the present invention may be further understood when read in conjunction with the appended drawings, in which.

and the spread (1σ and 2σ as indicated, where σ is the standard deviation). Empty triangles mark the bulk emission wavelengths.

Figure 3A:
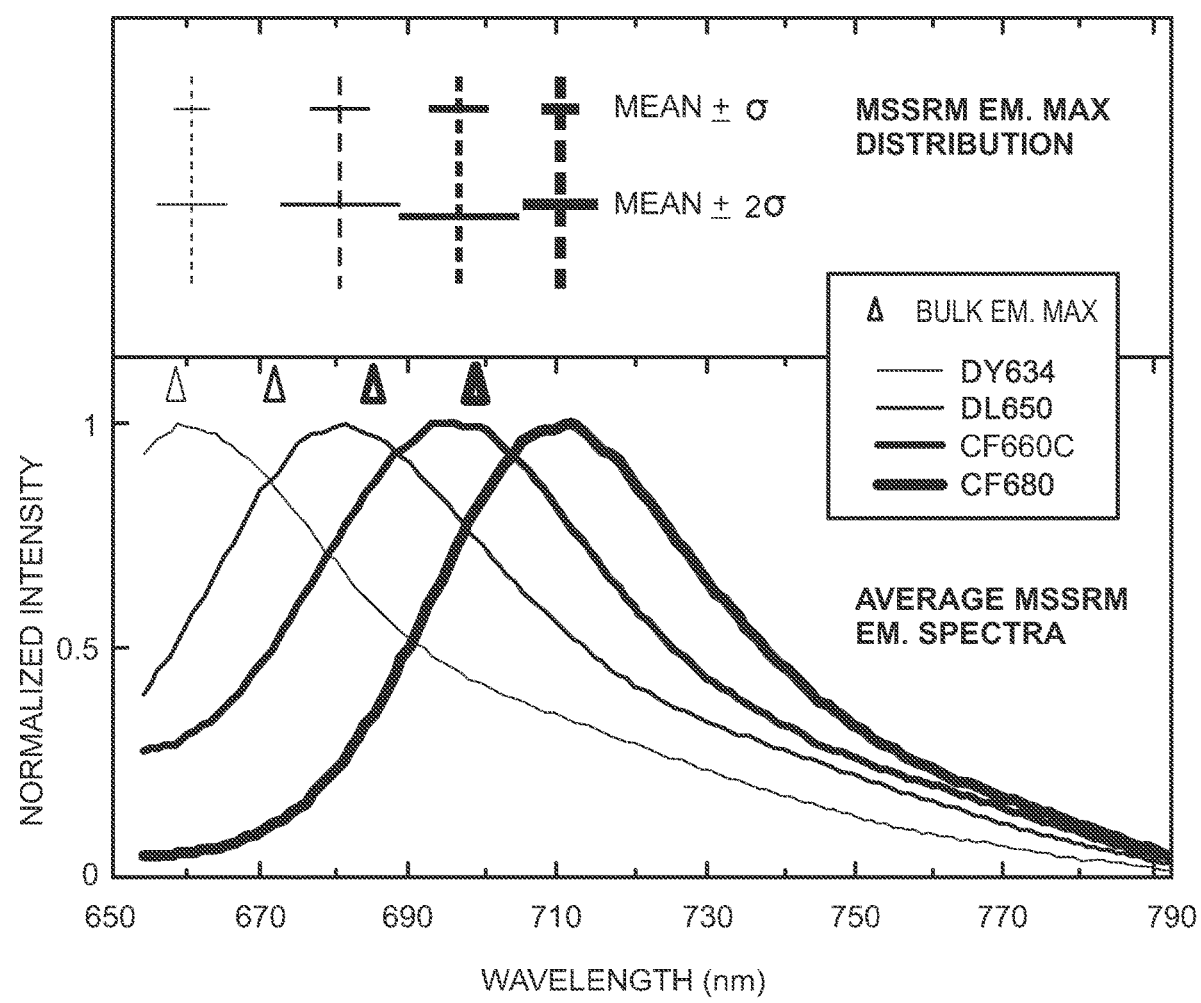
FIG. 3A illustrates average emission spectra of DY634, DL650, CF660C, and CF680 shown in wavelength units in the lower plot. The upper plot is the maximum emission wavelengths for the same four dyes measured on the MSSRM of FIG. 1A, shown as mean (vertical, dotted line)
Figure 3B:
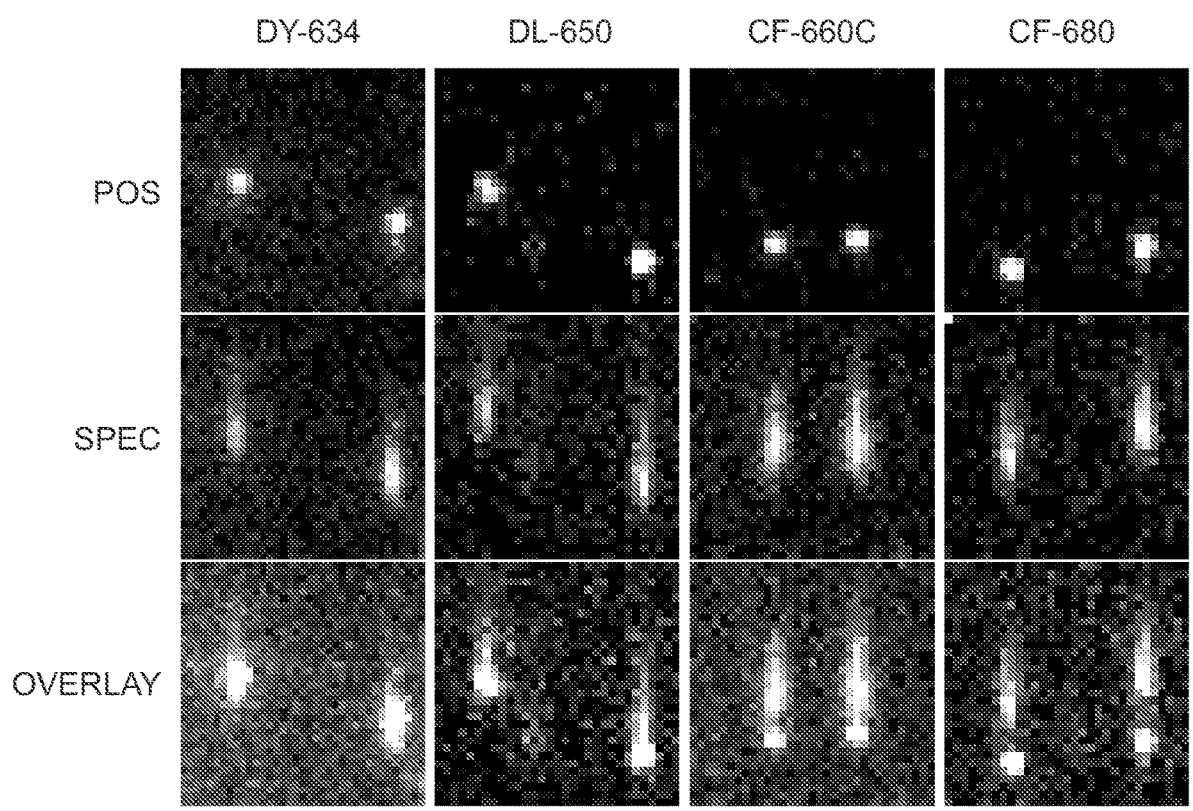

FIG. 3B illustrates a set of images showing positional information ("Pos"), spectral information ("Spec"), and an overlay of the two images, Pos and Spec, for each of the indicated labels.

Figure 3C:
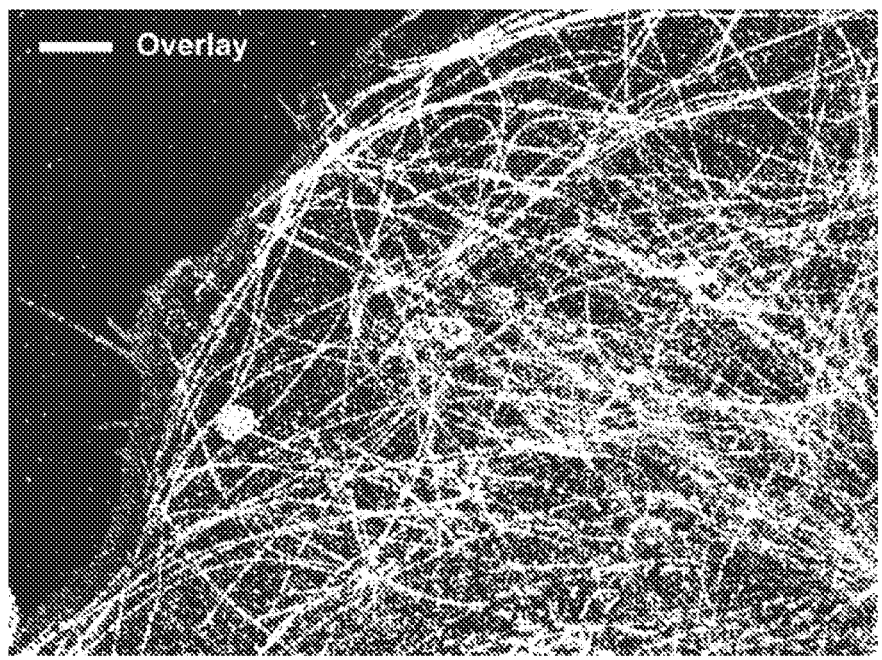
Figure 3D:
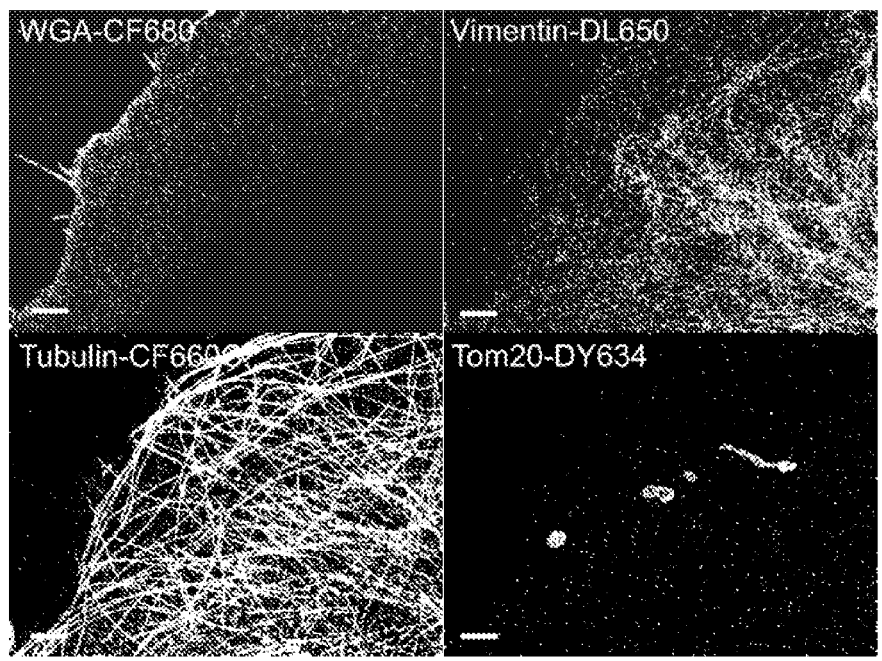

FIG. 3C illustrates an overlay of MSSRM images of U2OS cells of the four individual channels shown in FIG. 3D which are labeled for mitochondria (Tom20), intermediate filaments (vimentin), microtubules (tubulin), and membrane (WGA), with scale bars=2 μm.

Figure 4A:
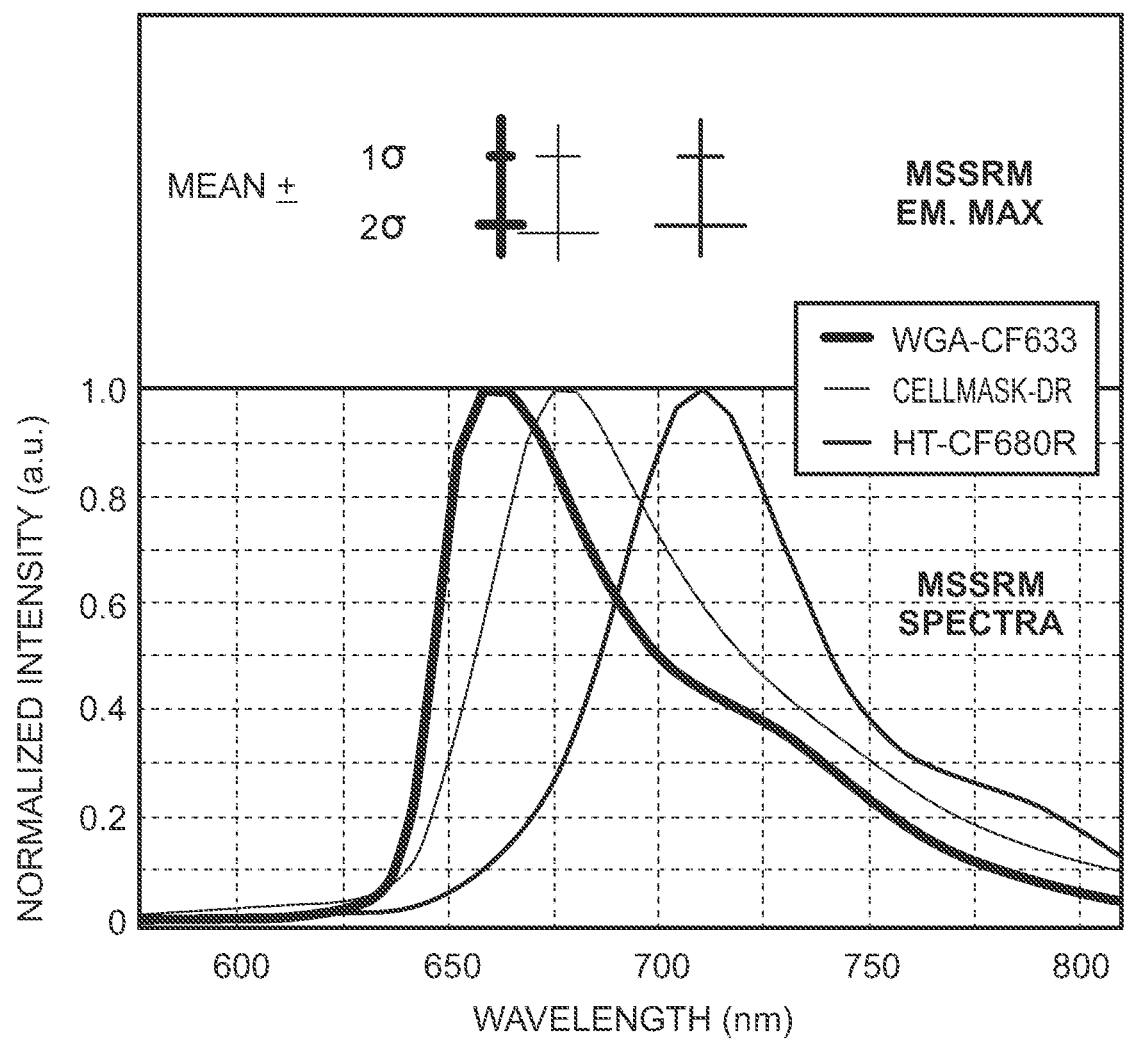
Figure 4B:
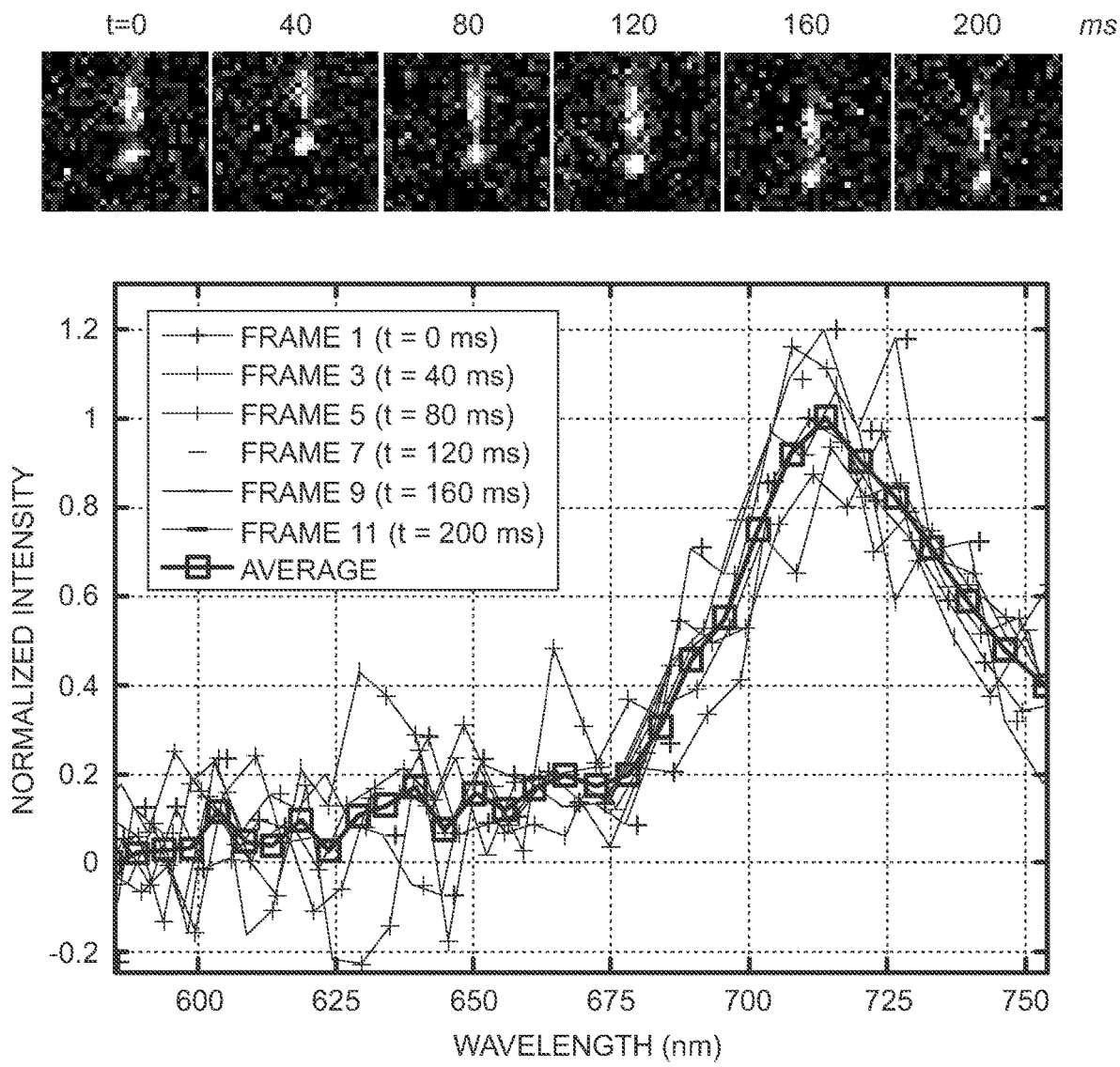

FIG. 4A illustrates in the lower panel the average MSSRM spectra of CF633, CellMask DR, and CF680R molecules measured in live U2OS cells. The upper panel shows the mean (vertical line) and spread (horizontal line) of MSSRM emission maximum for each fluorophore;

FIG. 4B, upper panel, illustrates a series of single-molecule positional and spectral images of CF680R recorded at 20 ms per frame and shown in 40 ms (every 2 frames) intervals. Here the spectra have not been corrected by image registration. Lower panel, measured single-molecule spectra (thin lines) of a CF680R molecule measured in different image frames overlaid on the average spectrum (thick line with square symbols).

Figure 4C:
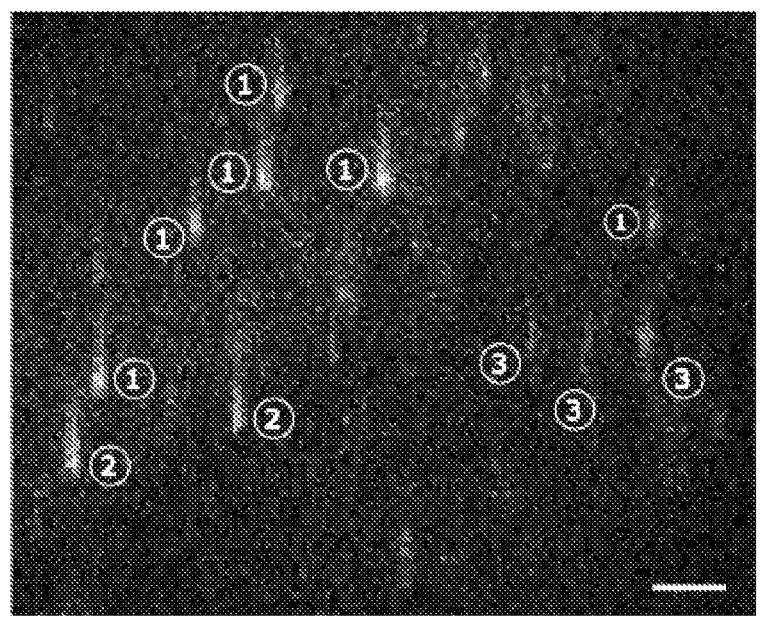
Figure 4C:
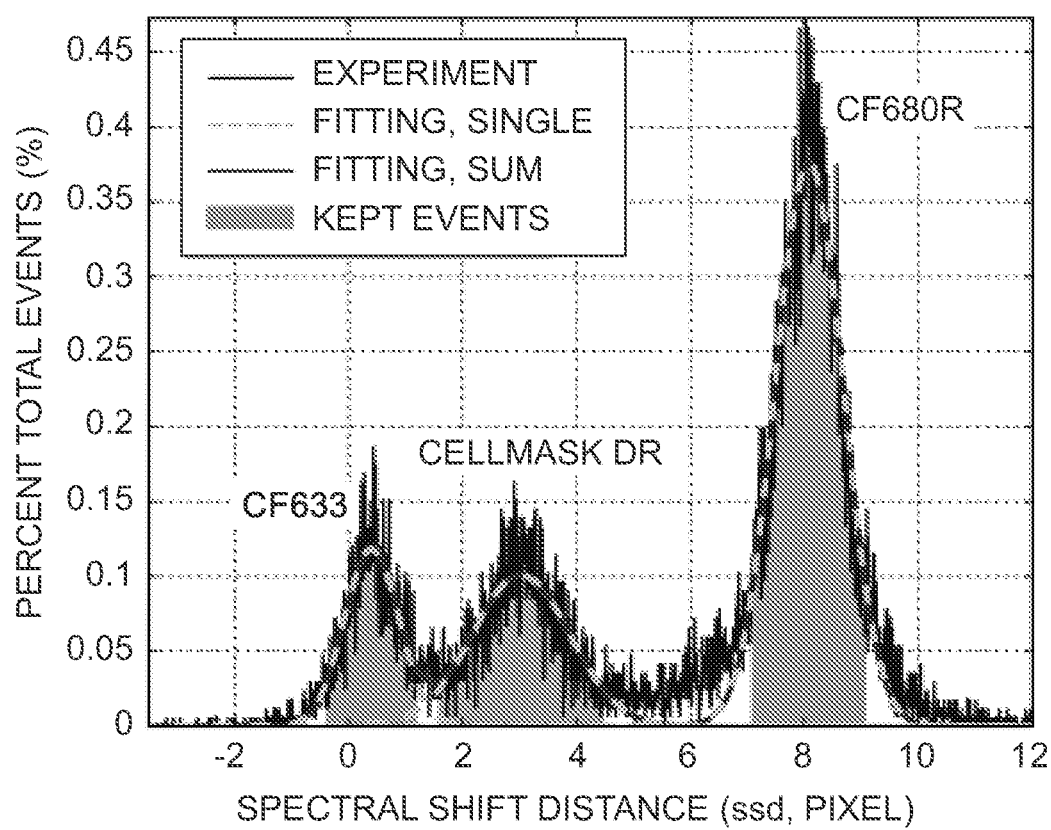

FIG. 4C illustrates in the upper panel a representative raw image frame taken on a live U2OS cell simultaneously labeled with WGA-CF633, CellMask DeepRed (CellMask DR), and human transferrin (HT)-CF680R, showing three distinct populations of molecules based on the separation between the positional and spectral images of the single molecules. Frame acquisition time is 20 ms. All three dyes may be excited with the same 637 nm laser. Markers 1, 2, and 3 indicate CF633, CellMask DR, and CF680R molecules, respectively. The lower panel illustrates a histogram of ssd values from a 3-color SMT experiment and results of fitting with 3 Gaussian distributions, where the dashed curves are individual fittings and the solid line overlying the dashed curve is the sum of all three fittings. Shaded areas indicate ranges of ssd values of which the associated localization events may be kept and assigned to specific fluorophores; other localization events may be discarded.

Figure 4D:
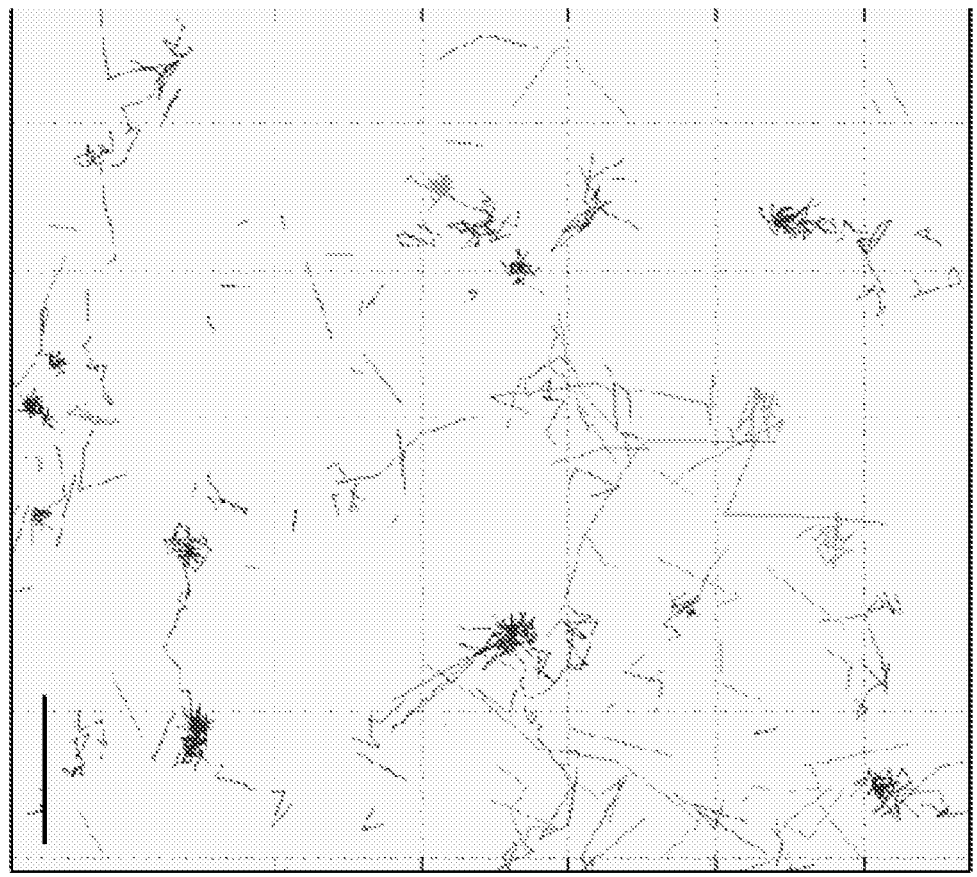
Figure 4D:
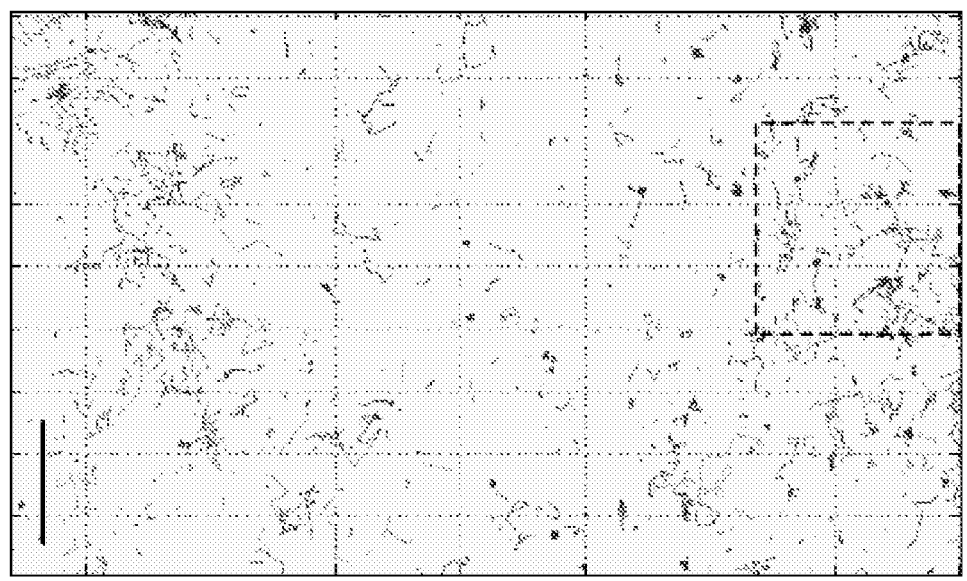

FIG. 4D illustrates example diffusion trajectories of the three molecular species in a live U2OS cell, obtained simultaneously on the MSSRM but separated into the three channels during sample processing. The lower panel is an overview of a part of a cell, and on the upper panel is a zoomed-in view of the boxed region of the lower panel.

Figure 5A:
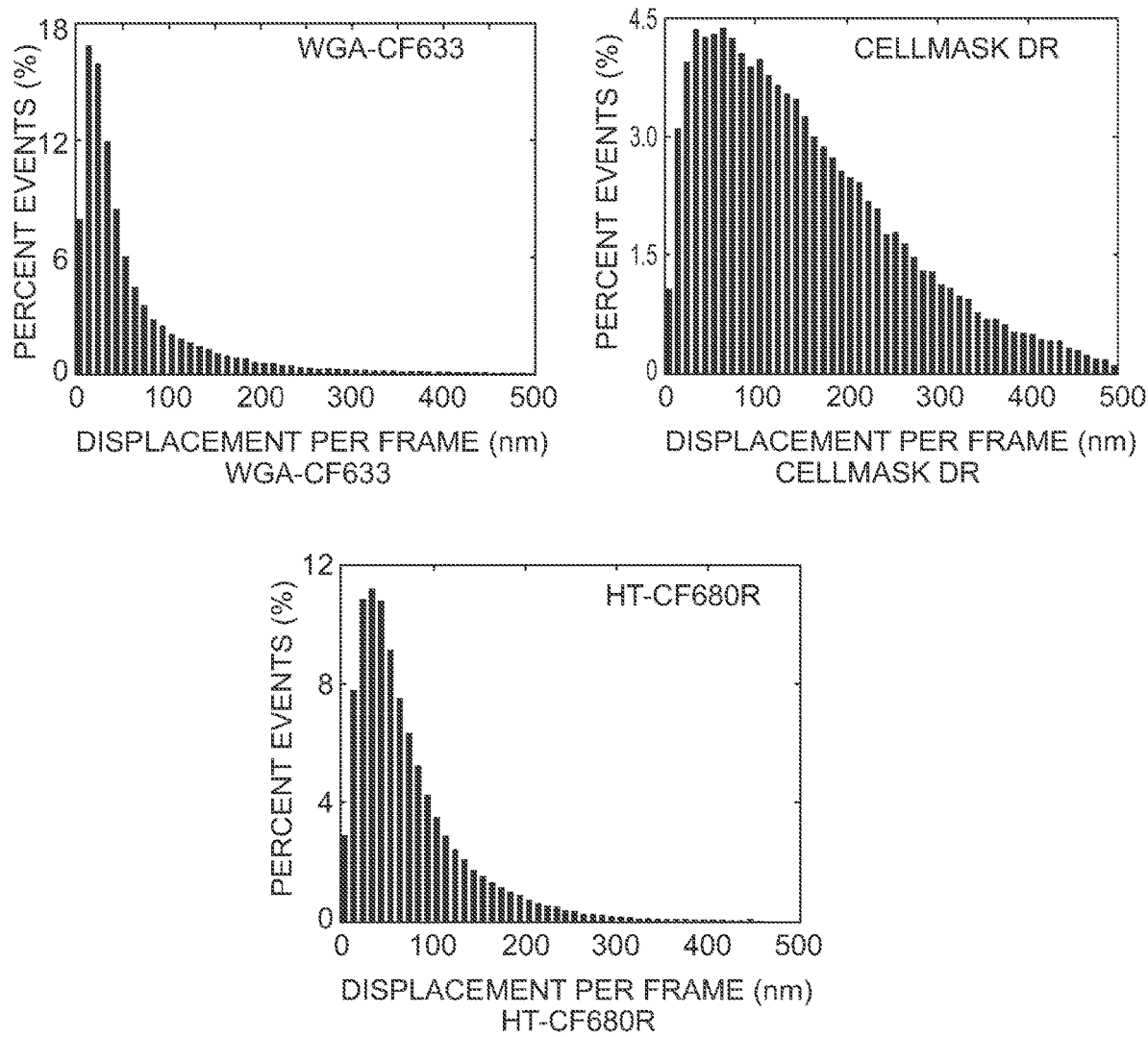

FIG. 5A illustrates histograms of frame-to-frame displacement of WGA-CF633, CellMask DR, and human transferrin-CF680R measured from a 3-color MSSRM SMT experiment.

Figure 5B:
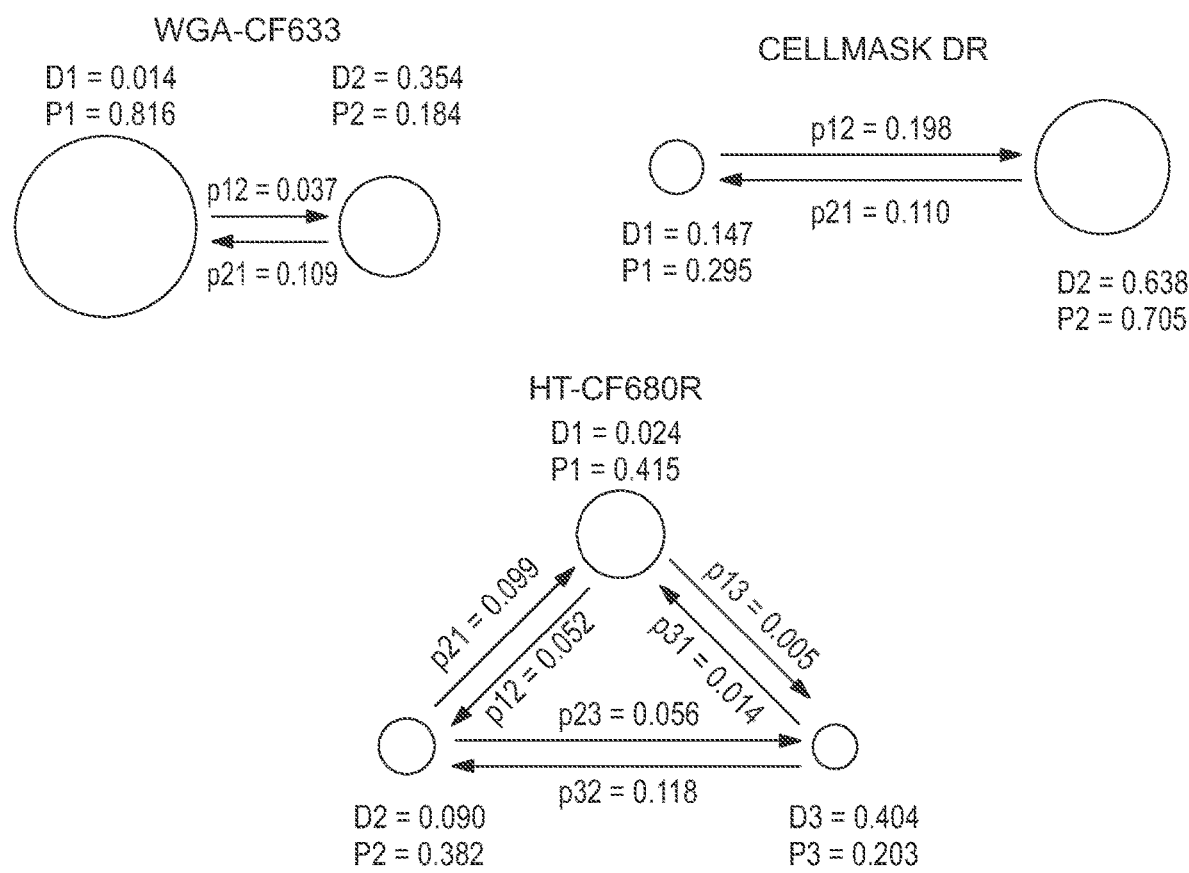

FIG. 5B illustrates diffusion states and interconversion rates based on vbSPT analysis of the same trajectories as in FIG. 5A. Sizes of the circles indicate probabilities of the molecules residing in the specific states. Diffusion constants of state i may be labeled as $D_i$, probability of molecules the state is $P_i$, and the interconversion rates between states i and j may be labeled as $p_{ij}$.

Figure 1A:
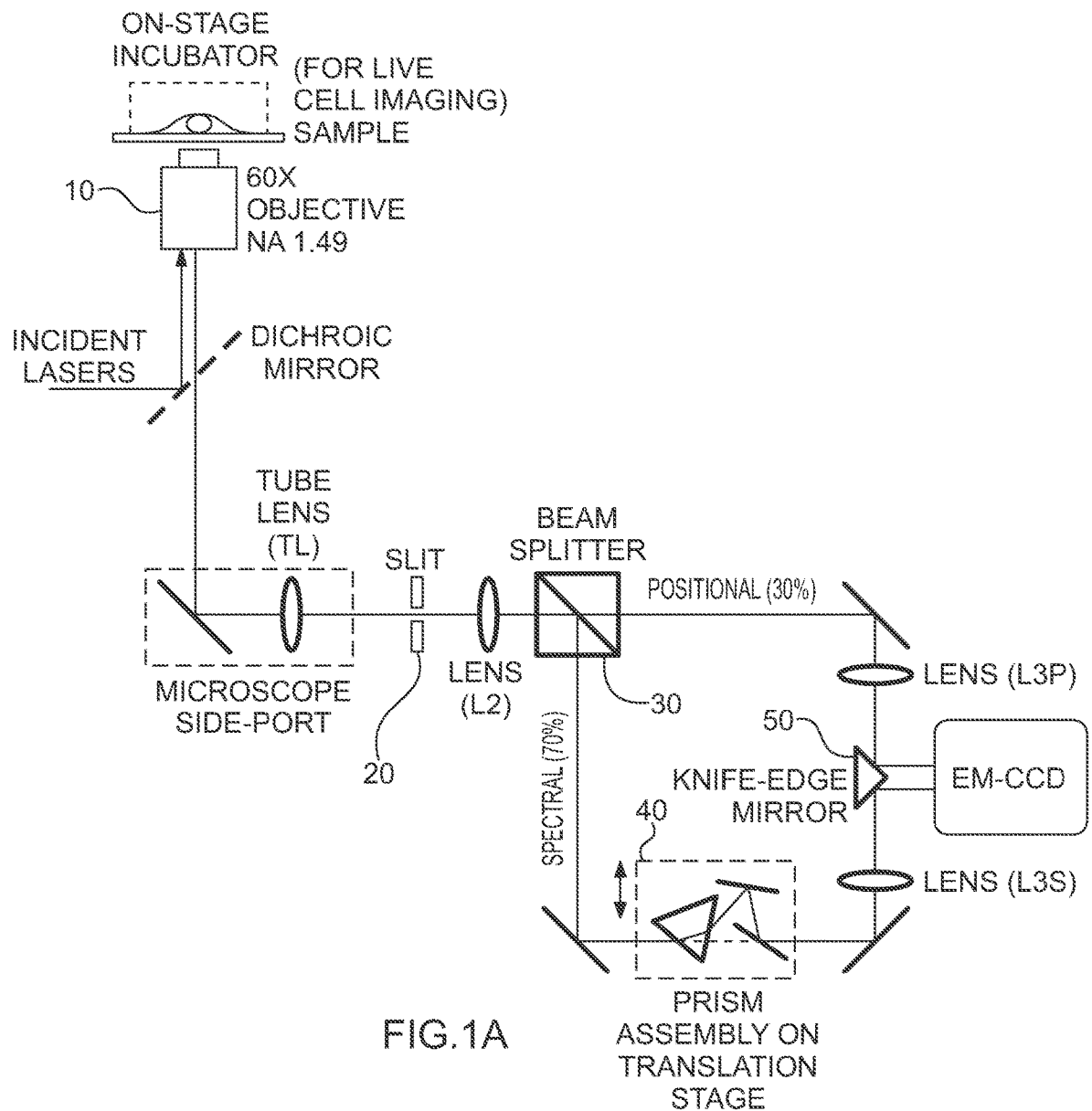
FIG. 1A schematically illustrates an exemplary configuration of a multispectral super-resolution microscope (MSSRM) in accordance with the present invention, which may be constructed based on a standard, single-objective single-molecule localization microscope. To achieve simultaneous recording of the positions and emission spectra of all fluorescent molecules in the field of view, signals from the sample may be split into two channels at 30:70% for the positional and spectral channels, respectively. The signals may then be projected to the left and right sides of the detector after passing through the lenses L3S (spectral) and L3P (positional), respectively, and combined on a knife-edge mirror. In the spectral channel, a prism assembly may include an equilateral prism and a pair of mirrors may be inserted in the infinity space between lenses L2 and L3S to disperse the signal. The prism assembly may be mounted on a translational stage so that it can be moved in and out of the beam path, and the pair of mirrors after the prism is used to align the light path so that the overall direction of light propagation does not change in this channel.
Figure 6A:
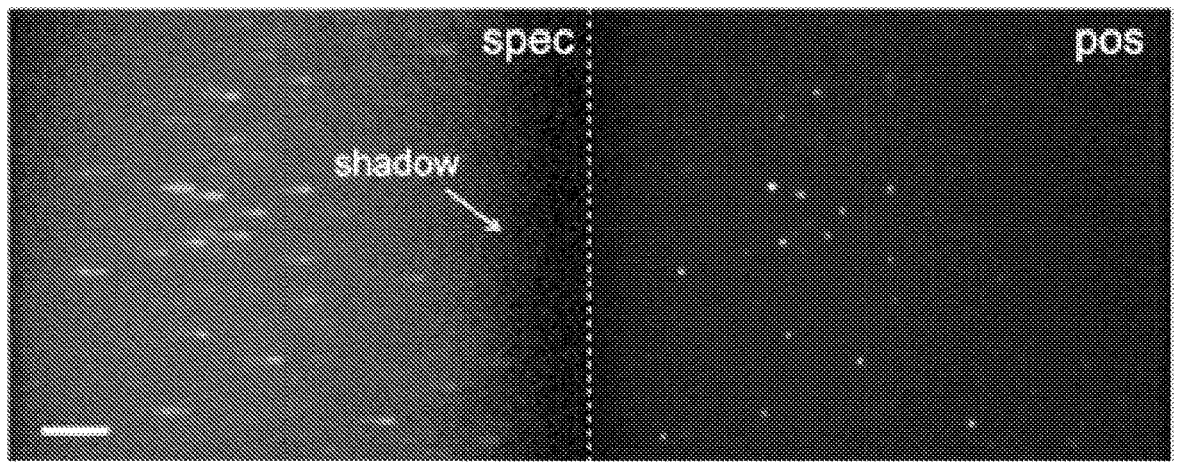

FIG. 6A illustrates how the prism of FIG. 1A can take an orientation such that the direction of light dispersion aligns with the left and right edges of the slit (light dispersion direction perpendicular to the longitudinal axis of the slit), resulting in 'horizontal' elongation of the single molecule images, where the slit edges cast shadows in the spectral channel.

Figure 6B:
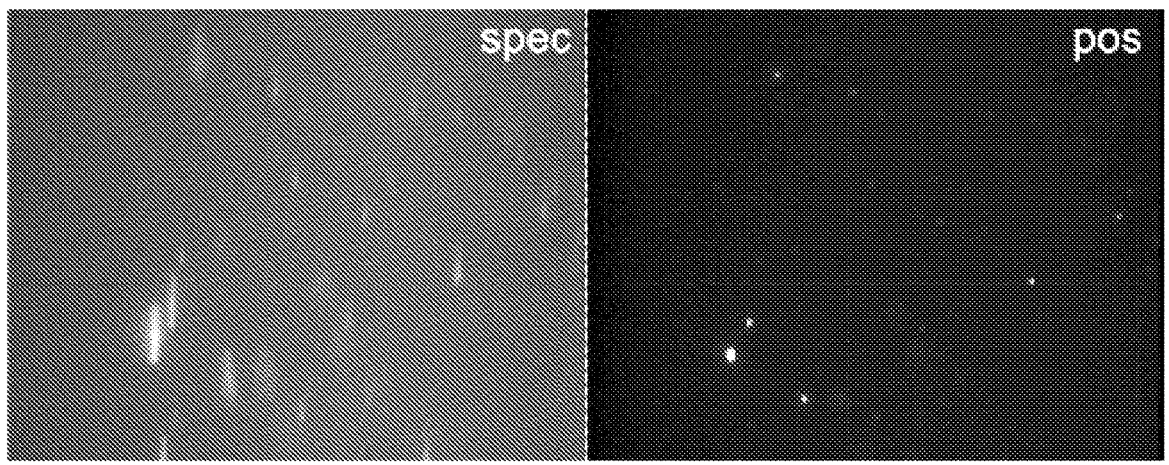

FIG. 6B illustrates how the prism of FIG. 1A can be oriented to yield a 'vertical' dispersion (light dispersion direction parallel to the longitudinal axis of the slit) where the shadows are instead cast by the top and bottom edges of the slit and may be outside of the field of view, hence not affecting the image quality.

Figure 7:
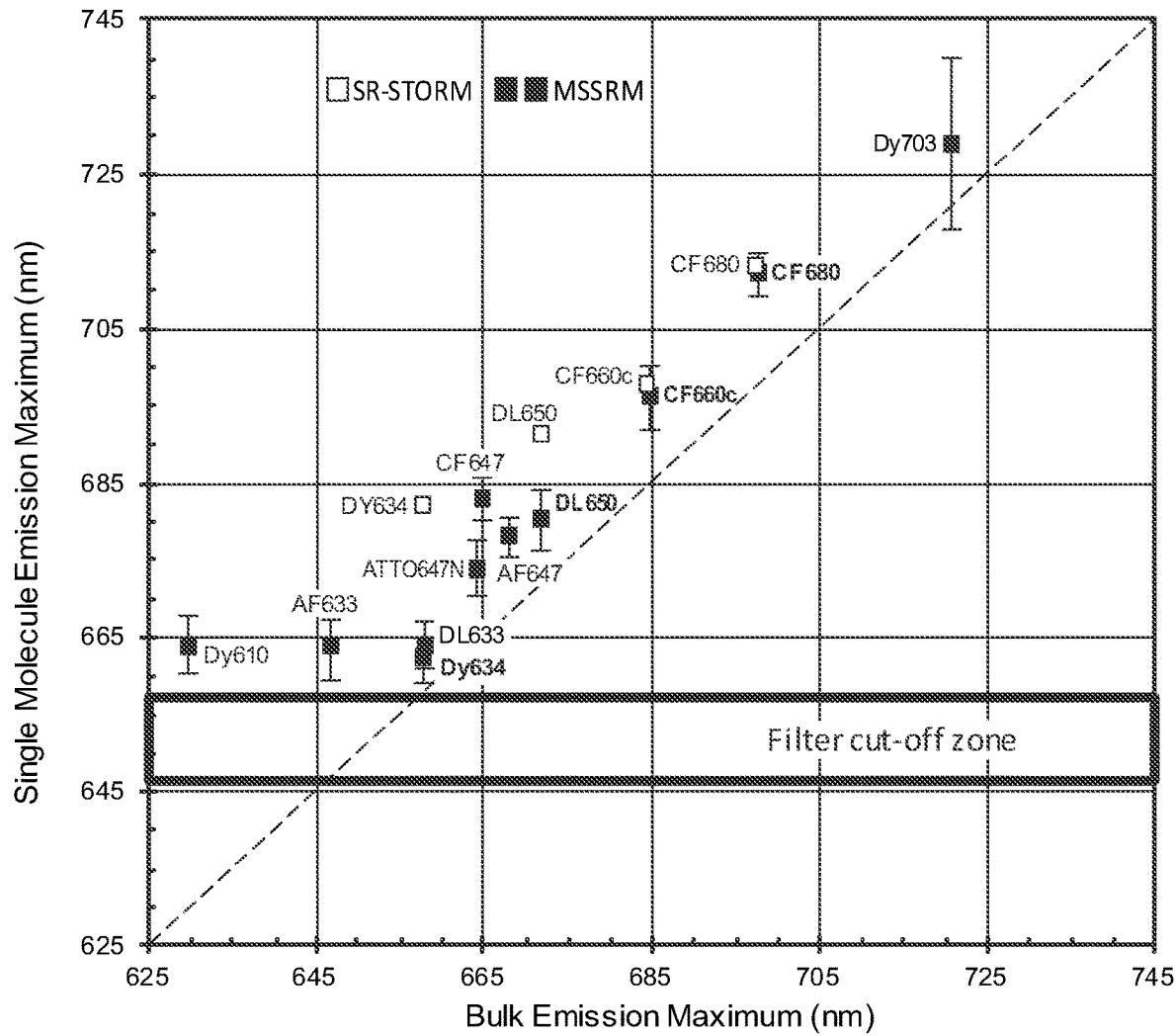

FIG. 7 illustrates the bulk and single-molecule emission properties of selected photoswitchable fluorophores: All fluorophores could be efficiently excited by a 637 nm laser with the exception of DY610, which was excited using a 561 nm laser. The fluorophores in blue were either conjugated to a secondary antibody or phalloidin. Bulk emission maximum wavelengths were measured using a UV-Vis spectrometer, and single-molecule emission maximum wavelengths and standard deviations were measured on the MSSRM of FIG. 1A or from SR-STORM (Zhang Z et al, Nat Methods 12, 935-938 (2015); incorporated by reference herein). Data for SR-STORM were read from the figures in Zhang et al. for DY634, DL650, CF660C, and CF680, which were used for 4-color imaging therein and in the present work; the MSSRM properties of the same fluorophores were highlighted in purple for comparison.

Figure 8:
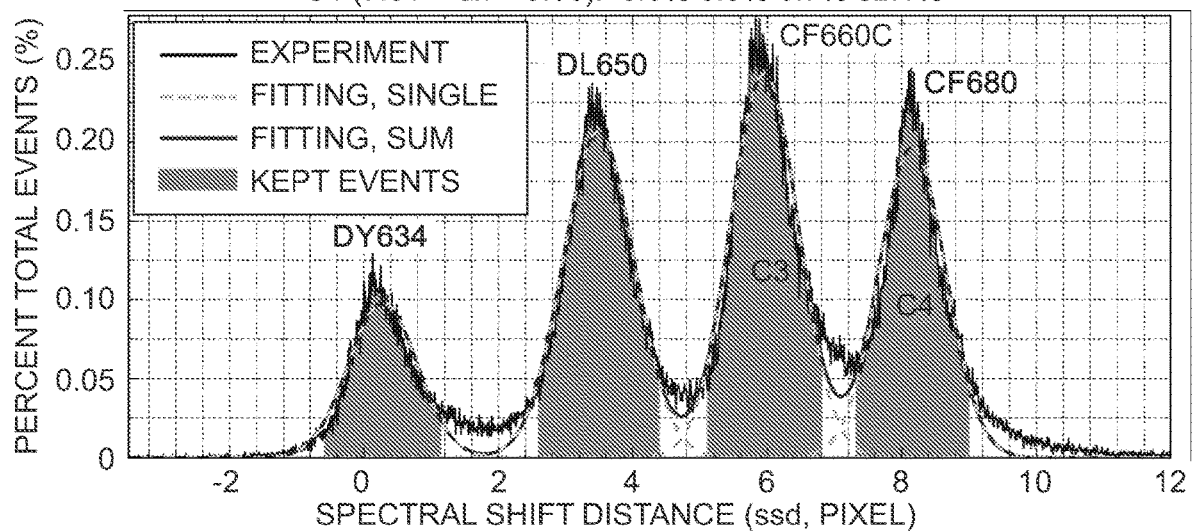

FIG. 8 illustrates a histogram of ssd from a 4-color MSSRM experiment: U2OS cells were stained and imaged as described below, and the measured ssd values for all detected localization events were plotted in the histogram. Each peak in the histogram is fitted with a Gaussian distribution (dotted line) and the sum of all 4 Gaussians. Based on their positions, the peaks may be designated to specific fluorophores as indicated. To reduce spectral crosstalk, localization events associated with ssd values that fall in the border region between two adjacent peaks were discarded. Specified ranges of ssd values for DY634, DL650, CF660C, and CF680 are (−0.59, 1.15), (2.59, 4.39), (5.10, 6.81), (7.31, 9.00), respectively, where the first and second numbers in the parentheses represent the lower and upper bounds of the ssd values. The resulting localization retention rates for the four fluorophores are all around 80%, and the spectral crosstalk between neighboring channels is between 0 to 0.7% in this case.

Figure 9:
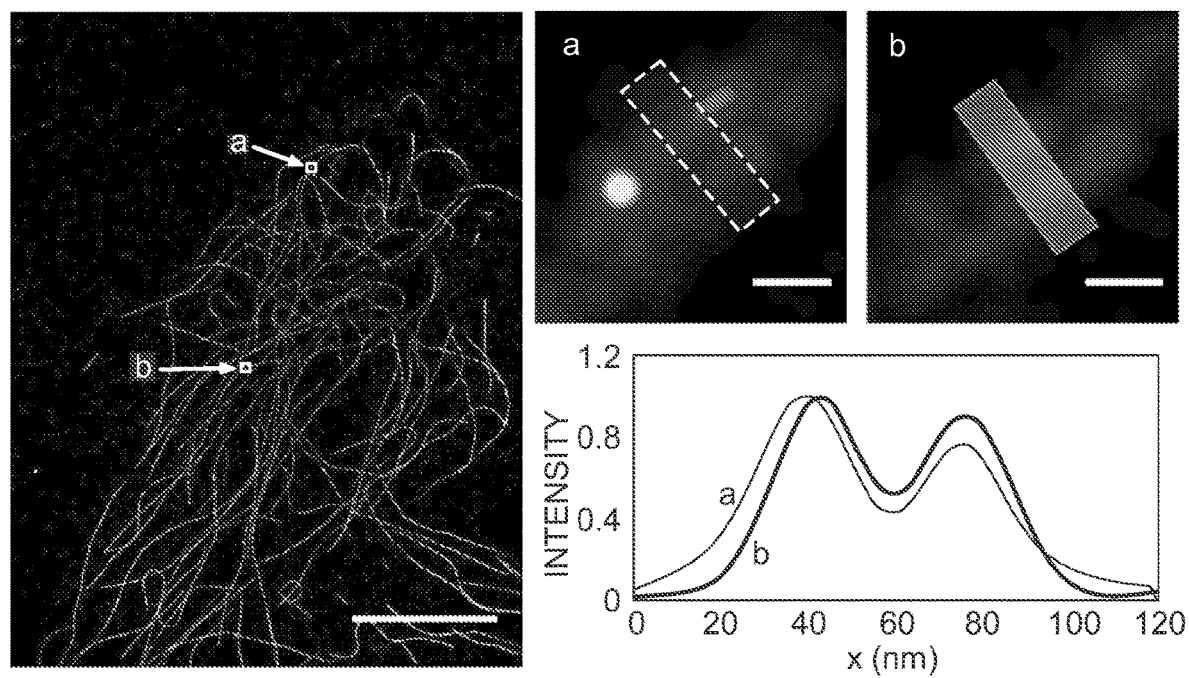

FIG. 9 illustrates resolving microtubule hollow structure on the MSSRM of FIG. 1A: U2OS cells were labeled with rat anti-α-tubulin antibody and AF647-conjugated donkey anti-rat secondary antibody (see Materials and Methods below) and imaged on the MSSRM using standard STORM imaging buffer (GLOX+100 mM MEA in PBS). Shown on the left panel is an overview of microtubules in a (part of a) cell, with regions "a" and "b" shown in zoom-in views on the top right panels, with "a" on the left and "b" on the right. Line profiles of the boxed regions are shown in the graph panel. Scale bars are 10 μm (left) and 50 nm (right). Note that the positional channel only received ~30% of the photons emitted from each AF647 molecule.

Figure 10A:
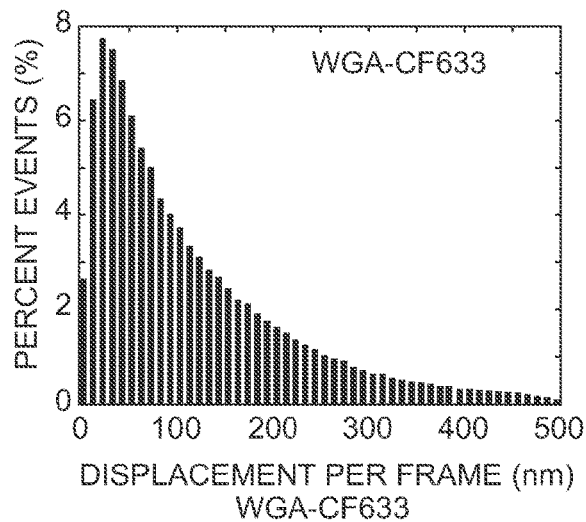
Figure 10A:
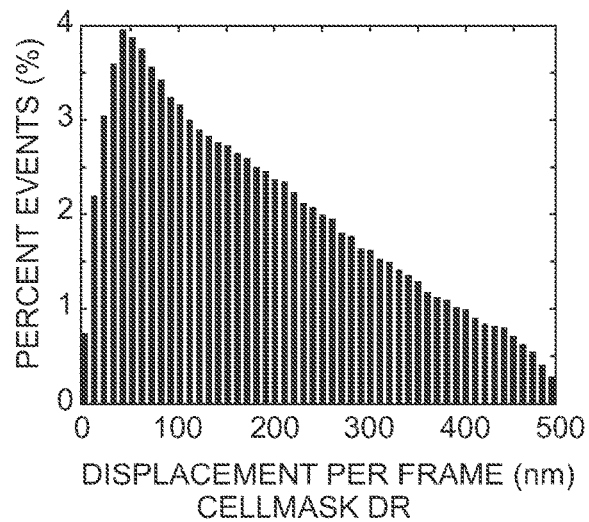
Figure 10A:
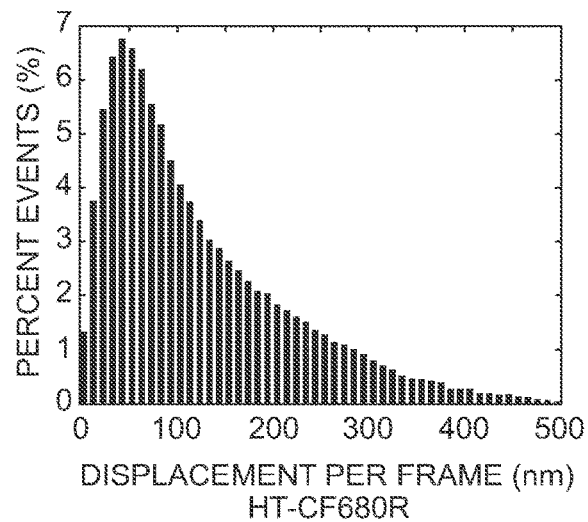

FIG. 10A illustrates live U2OS cells labeled with one of the three reagents and imaged on the MSSRM of FIG. 1A to obtain single-molecule trajectories. The trajectories were analyzed as described previously. Histograms of frame-to-frame displacements of each molecular species were measured from the single-color experiments.

Figure 10B:
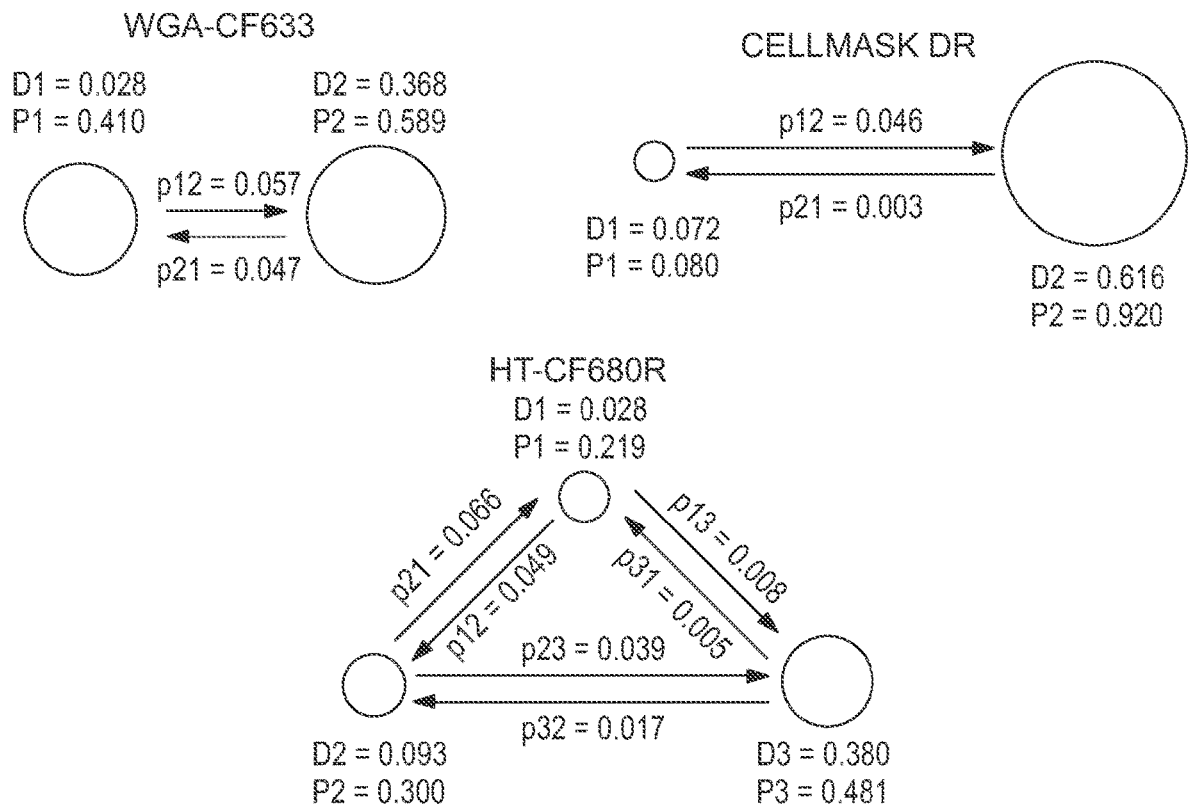

FIG. 10B illustrates live U2OS cells labeled with one of the three reagents and imaged on the MSSRM of FIG. 1A to obtain single-molecule trajectories. The trajectories were analyzed as described previously (Nickerson A et al, PLoS One 9, e100589 (2014); incorporated by reference herein). Diffusion state diagrams were obtained by analyzing the single-color trajectories with vbSPT (Persson F et al, Nat Methods 10, 265-269 (2013); incorporated by reference herein).

Figure 11:
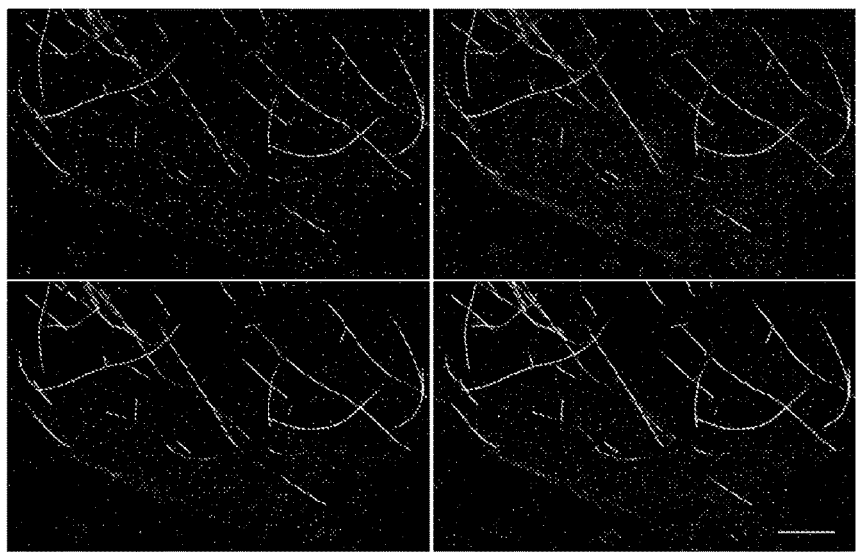

FIG. 11 illustrates how images in the different color channels acquired on the MSSRM of FIG. 1A may be inherently aligned: U2OS cells may simultaneously be labeled with DY634 (top left), DL650 (top right), CF680 (bottom left), and imaged with the MSSRM. The color channels were separated during data processing based on single-molecule emission spectra. Images in each color channel were overlaid to generate a composite image (bottom right). Scale bar is 5 μm.

Figure 12A:
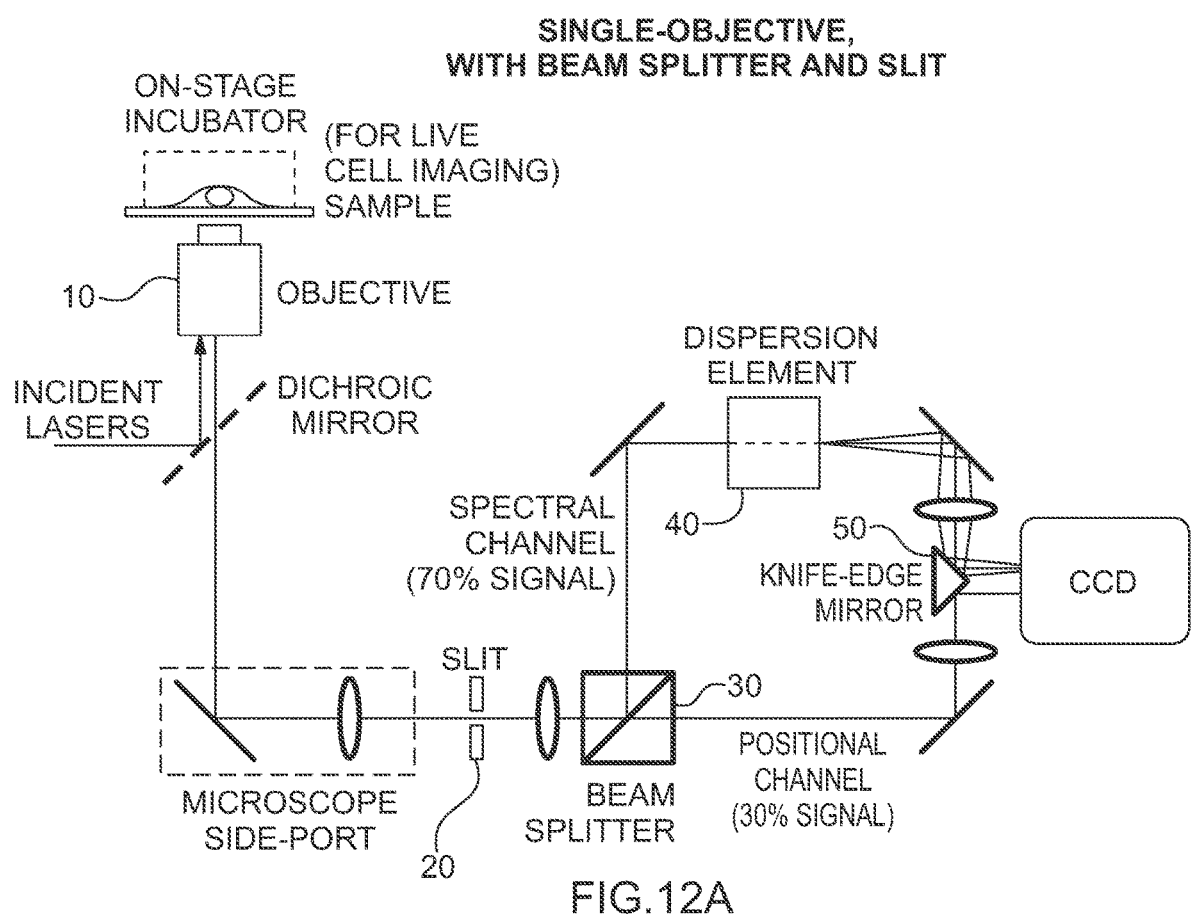
FIGS. 12A, 12B.
Figure 12B:
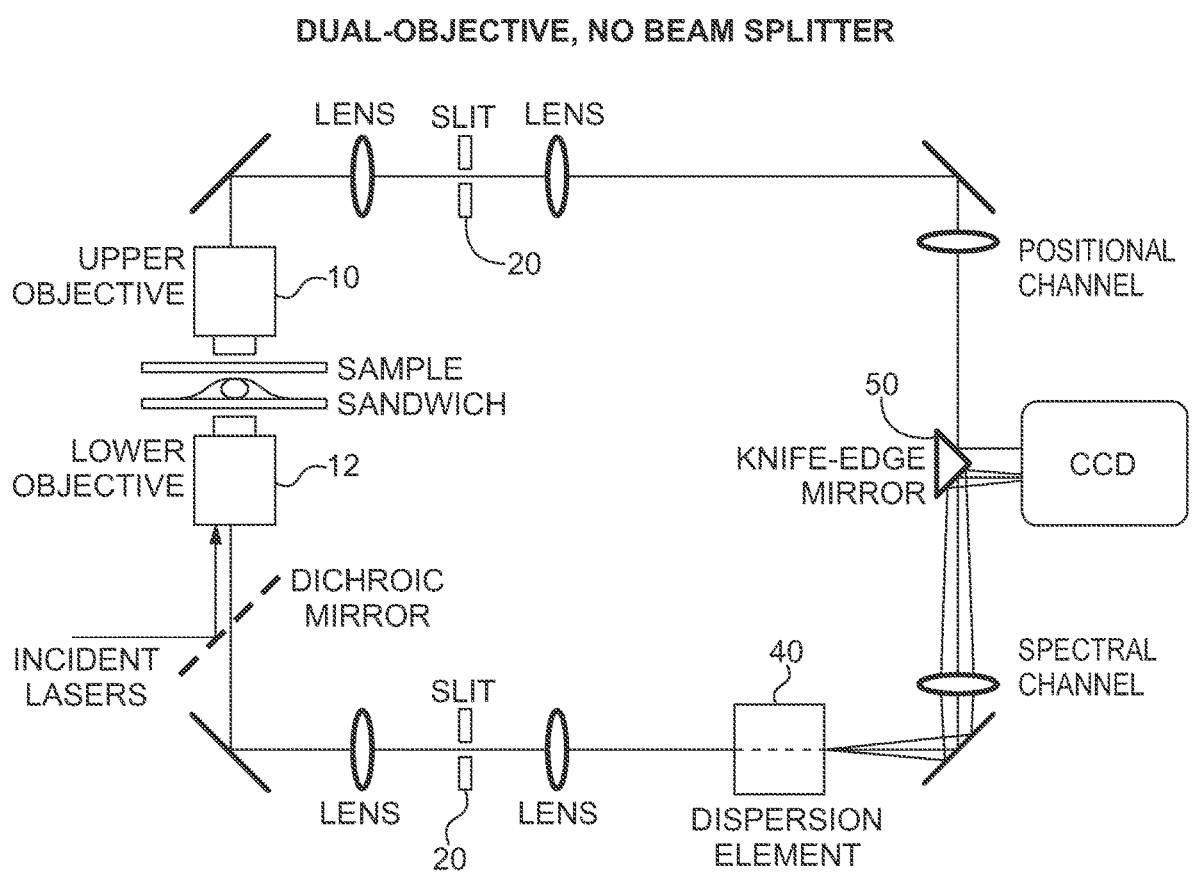
Figure 12C:
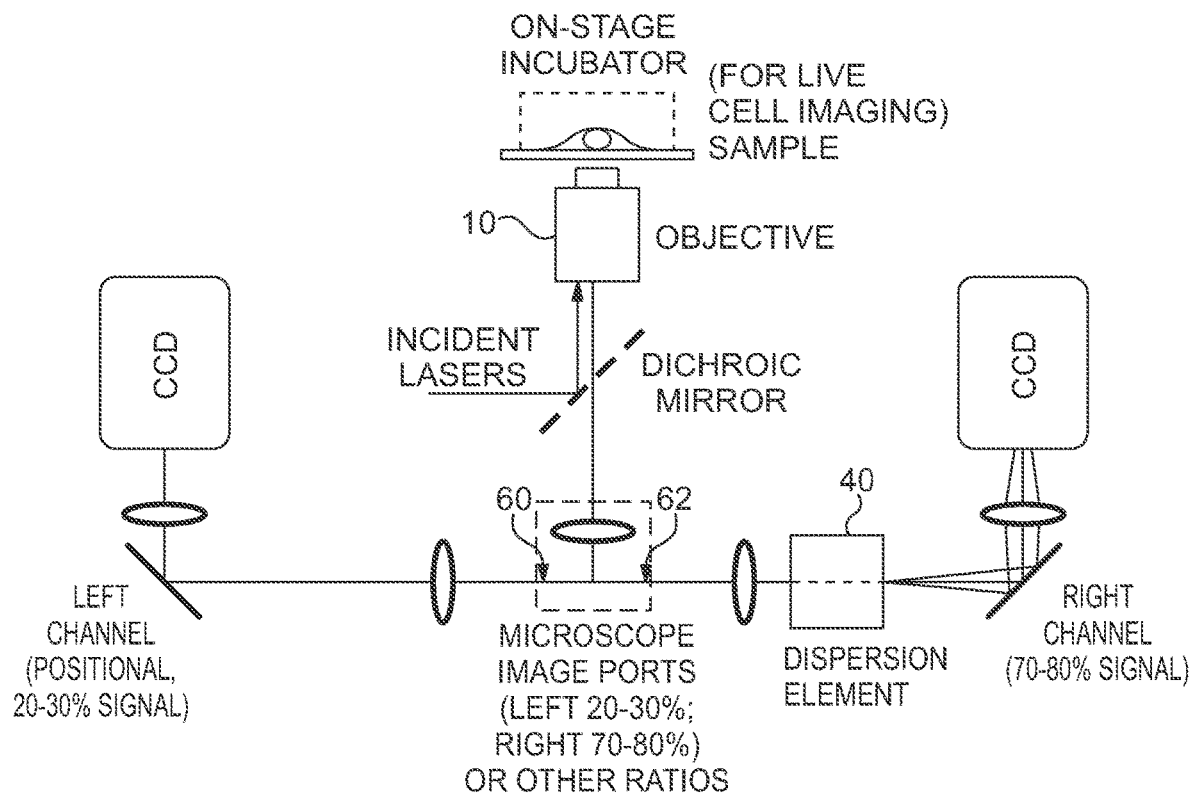

FIGS. 12A-12C schematically illustrate further exemplary configurations of MSSRM in accordance with the present invention having simultaneous positional and spectral image acquisition (positional-spectral) where one channel includes a spectral dispersion device, in which FIG. 12A has a single-objective microscope configuration in combination with a beam splitter; FIG. 12B has a dual objective microscope configuration; and FIG. 12C has a single-objective microscope with two image ports split at various ratios through a built-in image diverting prism provided in commercial microscope frames, each port has a separate camera associated therewith.

Figure 12D:
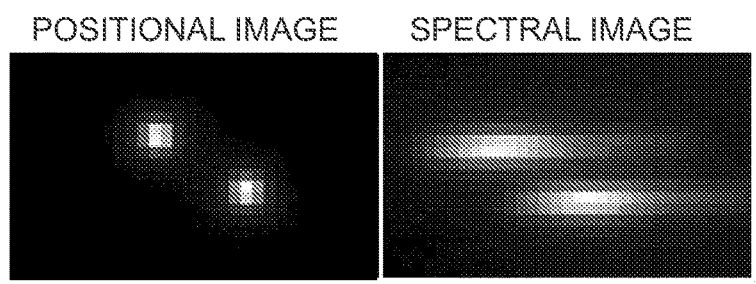

FIG. 12D illustrates images of position and spectral data from the device of FIG. 12B.

Figure 13A:
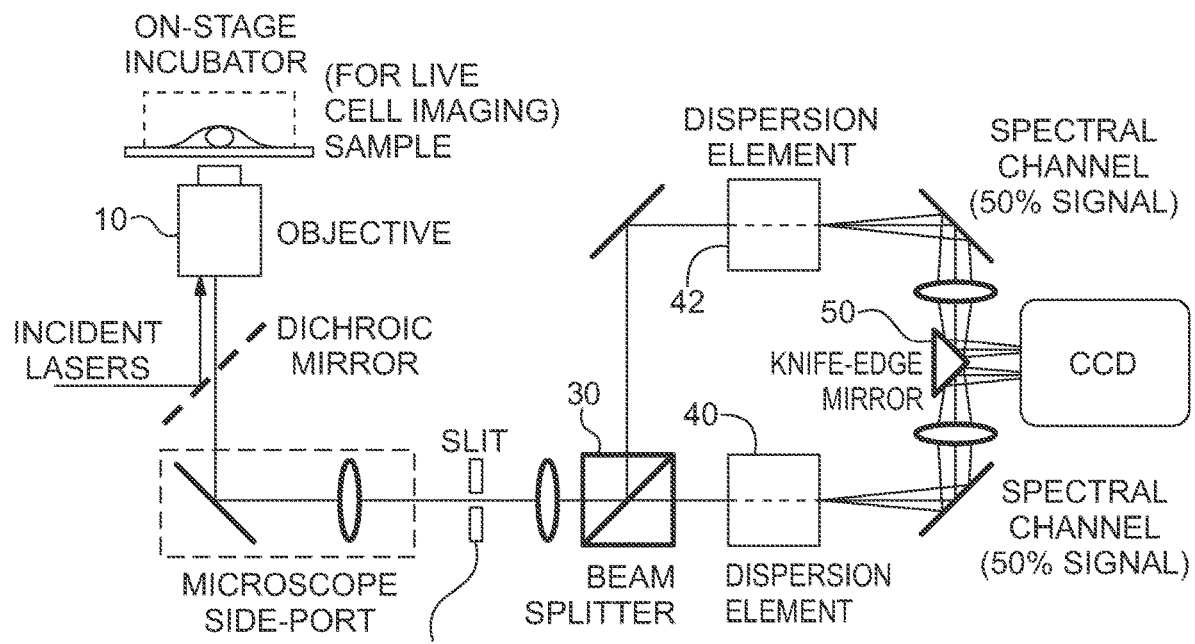
Figure 13B:
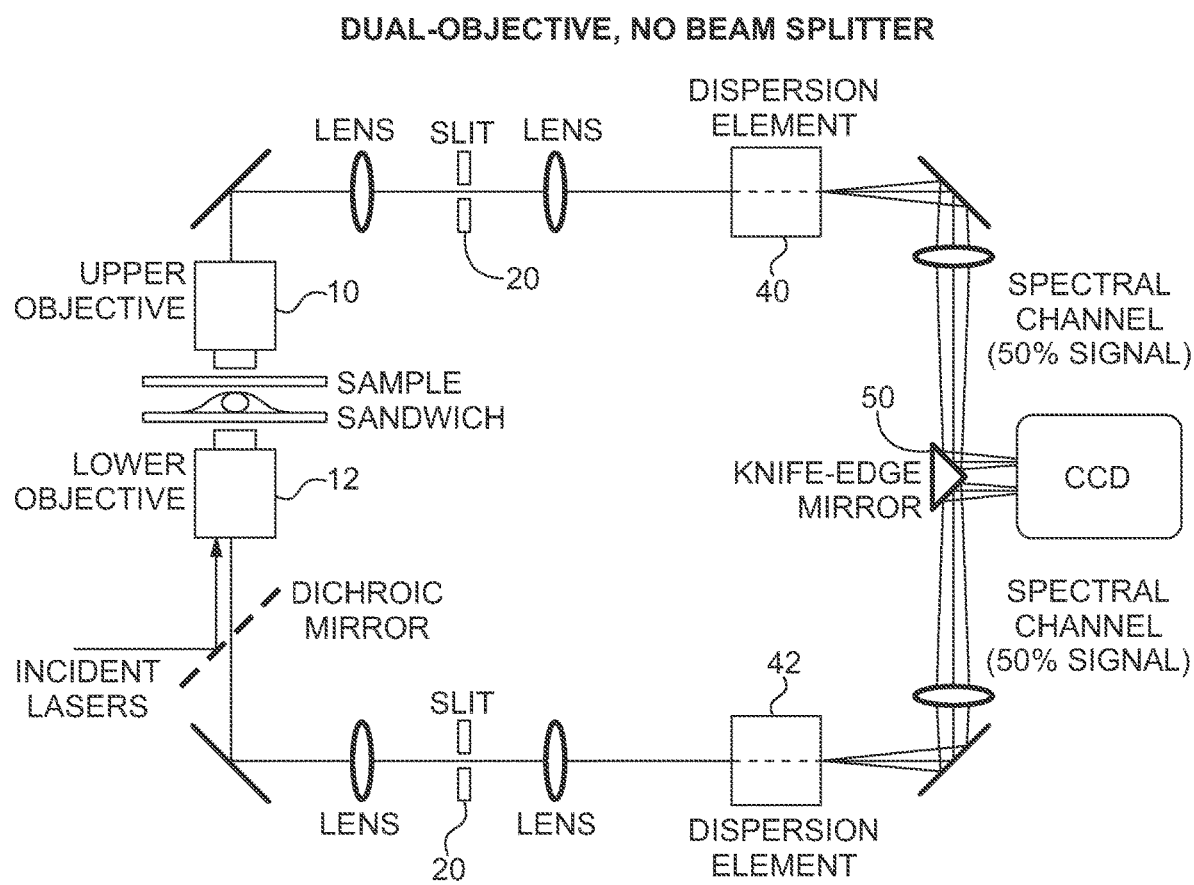
Figure 13C:
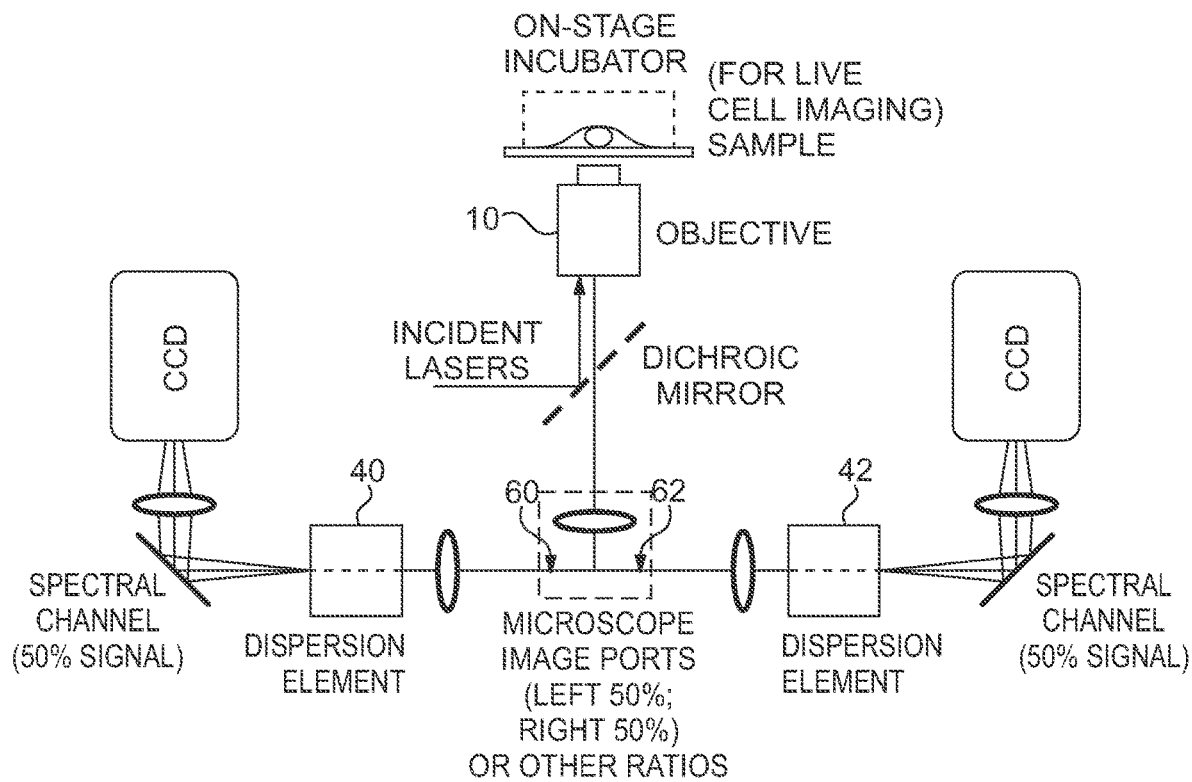
Figure 13D:
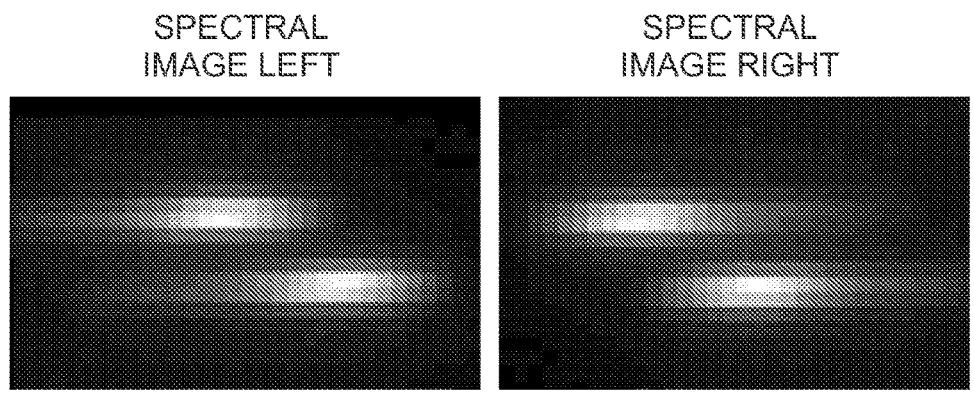

FIGS. 13A-13C schematically illustrate further exemplary configurations of MSSRM in accordance with the present invention having dual spectral image acquisition (spectral-spectral), in which FIG. 13A has a single-objective microscope configuration in combination with a beam splitter; FIG. 13B has a dual objective microscope configuration where one channel contains a spectral dispersion device; and FIG. 13C has a single-objective microscope with two image ports split at various ratios through a built-in image diverting prism provided in commercial microscope frames, each port has a separate camera associated therewith.

Figure 13E:
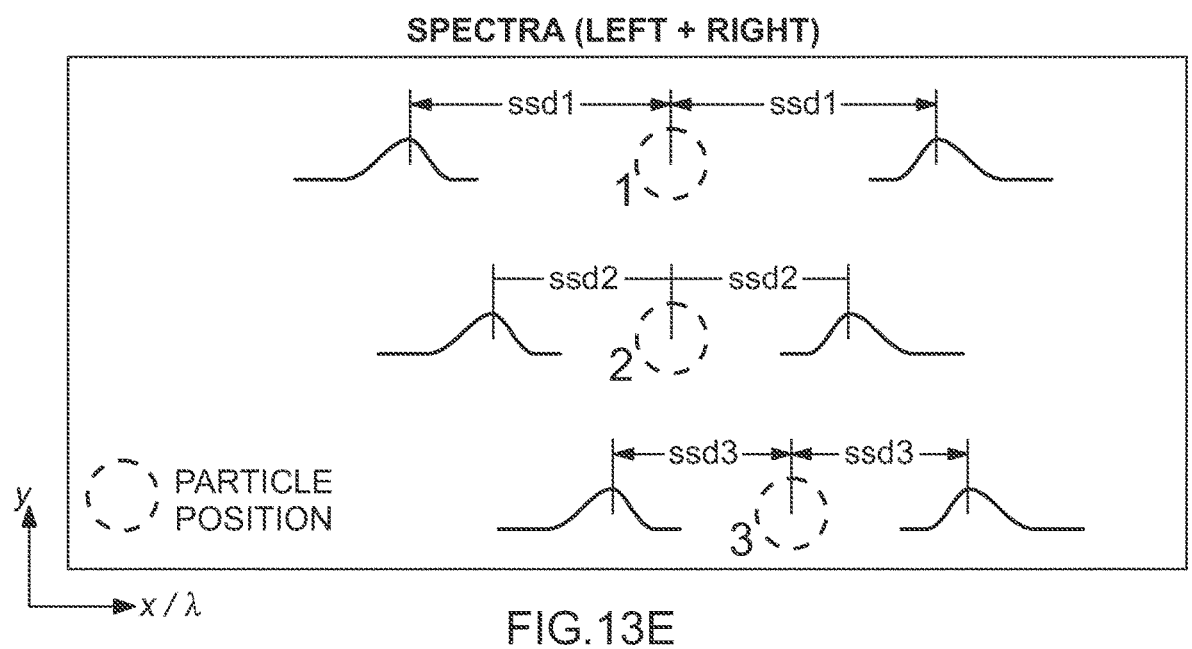
Figure 13F:
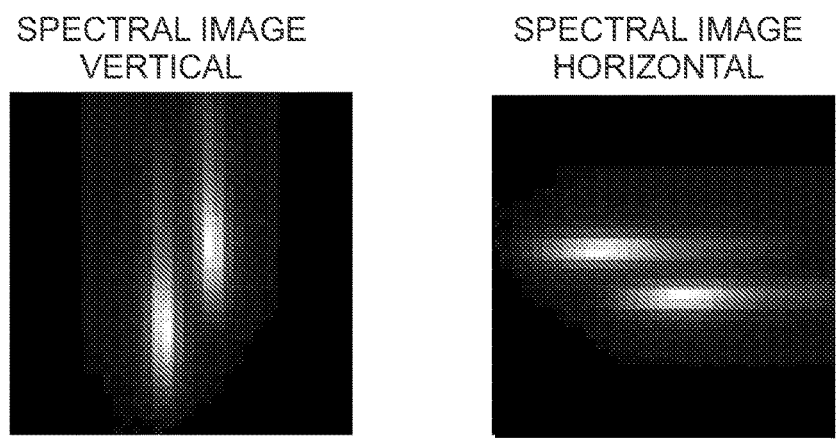
Figure 13G:
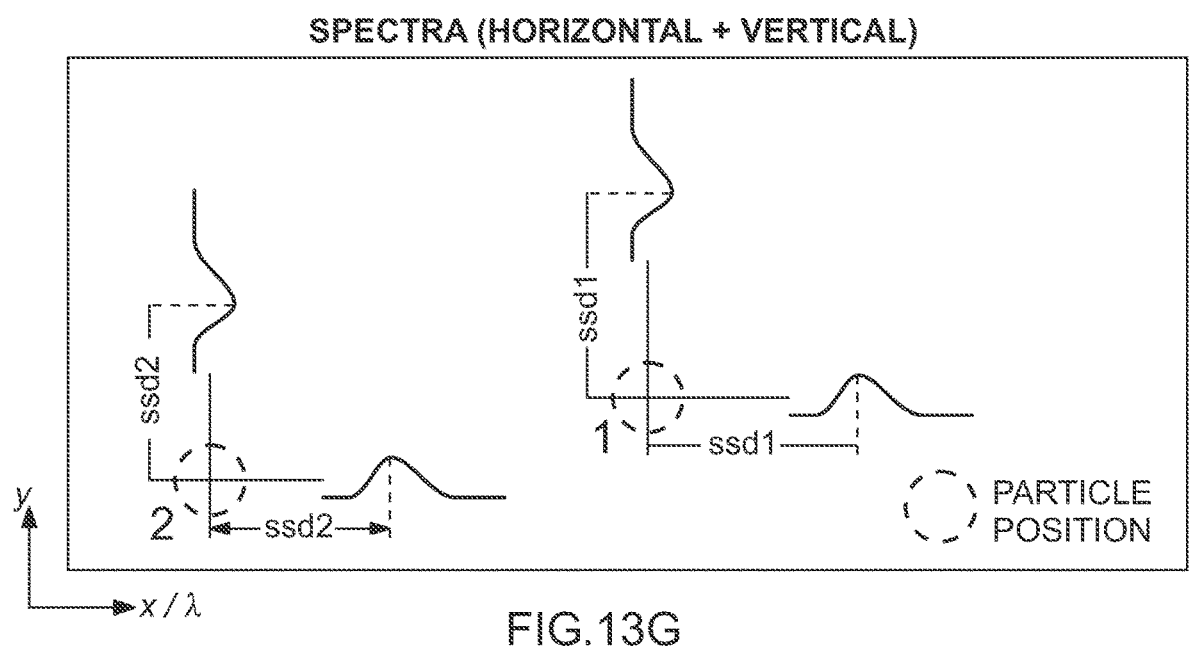

FIGS. 13D-13G illustrate pairs of spectra from corresponding spectral channels of the devices such as those of FIGS. 13A-13C in which each pair of spectra are offset from one another, either in opposite directions (FIG. 13D, 13E) or perpendicular to each other (FIG. 13F, 13G).

For all the dual-spectral image configurations, the concept of ssd still holds in that the shift in spectral image relative to the actual position of the molecule may be directly determined by the center emission wavelength of the fluorescent molecule. Thus, when both images are spectral images, the two spectral images either become 2*ssd apart when both are dispersed in the same dimension but in opposite directions, or they are each ssd apart from the true position of the molecule in both x and y dimensions when the dispersions are in perpendicular directions. In either case, the true position of the molecule can be calculated using the measured spectral images.

FIGS. 14A-14D schematically illustrate exemplary configurations of dispersion elements which may be used in the configurations of FIGS. 12A-12C, 13A-13C, in which FIGS. 14A, 14B illustrate prism assemblies, with FIG. 14B illustrating an Amici prism which disperses light without changing the overall direction of the light rays at a specific, center wavelength. Light at shorter and longer wavelengths generate rays pointing up- or down-ward relative to the center wavelength. Overall the compound Amici prism is doing the same thing as the prism assembly of FIG. 14A.

FIG. 14C schematically illustrates diffraction by transmissive or reflective grating assemblies, and FIG. 14D schematically illustrates dispersion by imaging optics having lateral chromatic aberration, such as a pair of lenses with lateral chromatic aberrations. In FIGS. 14A-14D, the incident light is typically a group of parallel rays with all colors traveling in the same direction; upon passing through the dispersion element, light in different wavelengths start to diverge due to the differences in the experienced refraction indexes (prism, FIGS. 14A, 14B), diffraction angles (grating, FIG. 14C), or lateral focusing positions (FIG. 14D). As a result, in the exiting light the different wavelength components (colors) in the signal from each molecule no longer travels in parallel; instead, each color arrives at a slightly different pixel on the detector. All the devices will be installed at the Fourier plane of the last image formation lens before the image detector to yield a clearly resolved emission spectrum.

DETAILED DESCRIPTION

Disclosed herein is a MultiSpectral, Super Resolution fluorescence Microscope (MSSRM) that overcomes the limitations of current multispectral microscopes. This may be achieved by acquiring images using a single-objective on a commercial, inverted microscope frame, or by acquiring images using a dual-objective configuration on a compatible (such as a custom built) microscope frame. Fluorescence signals collected through the objective(s) 10, 12 are analyzed using two optical paths, one of which acquires images showing spectral information and the other acquires images showing spectral (FIGS. 13A-13G) or positional information (FIGS. 1A, 12A-12D).

Spatial and spectral resolutions of both the single- and dual-objective systems are comparable to that achieved with the dual-objective SR-STORM. The performance of the MSSRM can be demonstrated through the acquisition of images of cellular structures in 4 colors with very low spectral crosstalk (2% or better) using fluorophores previously used in SR-STORM and a single laser excitation. Furthermore, single-objective MSSRM can readily be used for simultaneous multicolor SMT in live cells, also using a single laser excitation, at ~20 ms time resolution during which cells are kept under physiological conditions using an on-stage incubator.

Construction and calibration of the MSSRM. FIG. 1A shows a schematic diagram of a single-objective MSSRM in accordance with the present invention built on a commercial, inverted microscope frame. The same, high numerical aperture objective 10 is used to illuminate the sample and collect the fluorescence signal. The signal is subsequently split at a ~70:30 ratio between a positional channel and a spectral channel, and the resulting signals in the two channels are projected onto the left and right halves of the same EM-CCD (Andor, iXon Ultra 897) to yield two images side-by-side. A dispersion element 40 (FIG. 12A) such as a prism assembly (FIG. 1A, 14A, 14B) is then inserted in the Fourier plane in the spectral channel to disperse the signal from each fluorophore into its spectral components. A slit 20 may be placed at the intermediate image plane clips the image to a size matching half of the CCD chip.

Figure 1B:
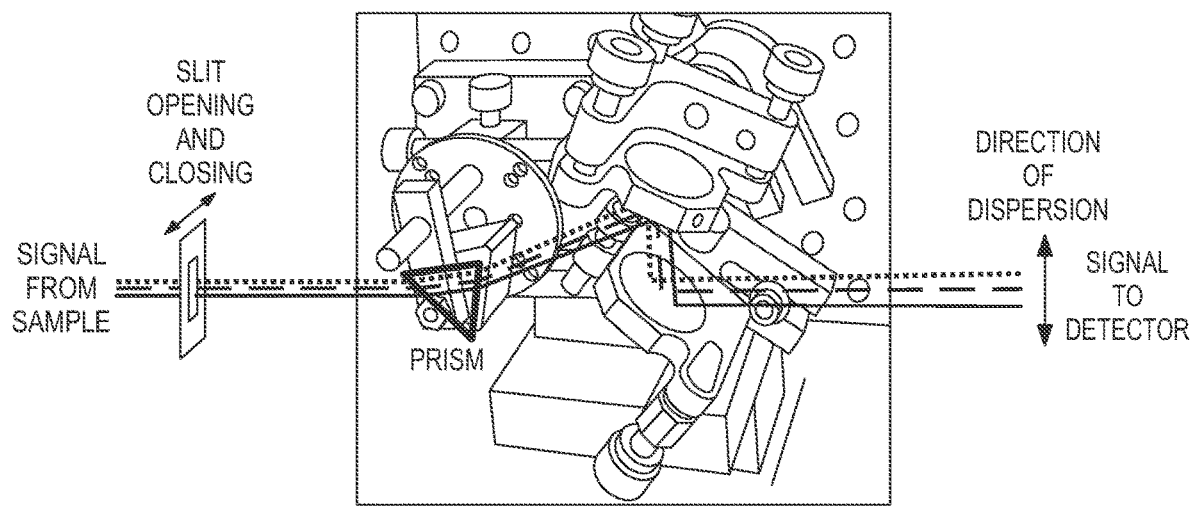
FIG. 1B schematically illustrates an isometric view of the exemplary configuration of the prism assembly of FIG. 1A. The prism may be mounted on its side so that the signals come in at the minimum dispersion angle and the prims induces dispersion in the direction perpendicular to the closing direction (horizontal in this case) of the slit (i.e., the direction of dispersion is parallel to the longitudinal axis of the slit).

Optionally, the dispersion element 40 can be constructed on a translational stage to conveniently move it in and out of the light path. With the assembly out, the two channels can be aligned to yield nearly identical images with subpixel precision. The prism assembly, which comprises an equilateral prism and a pair of mirrors (FIG. 1A, 14A), is then put into the light path of the spectral channel to disperse the signal. The prism also diverts the signal beam, but the diversion is corrected by aligning the pair of mirrors behind the prism (FIG. 1A, 14A) to steer the spectral image back to the same location on the EM-CCD as without the prism assembly (FIG. 1B). Alternatively, an Amici prism may be provided without the use of additional mirrors, FIGS. 12A, 14B. As shown herein, the prism (FIGS. 1A, 14A, 14B) is oriented to disperse light in the direction parallel to the left and right edges of the slit 20, such that the slit edges do not cast shadows in the spectral image (FIGS. 6A and 6B).

The MSSRM in accordance with the present invention can also be configured as a dual-objective system (FIG. 12B), which uses upper and lower objectives 10, 12 placed on the two sides of a sample sandwich. The two objectives do not need to be identical, and the detection channels (positional and spectral) defined by the two objectives can be operated independently. Each channel can have its own set of lenses, slit 20, and other optics depending on the type of images to be acquired. The images generated in the two channels can be combined with a knife edge 50 mirror (or another type of image combining device) or recorded on two separate detectors depending on the budget, space, or other considerations. In one example, we have set up the MSSRM on a commercial, inverted microscope where the upper (positional) detection channel uses a long working distance, water-dipping lens (Zeiss 63×, NA 1.1) and has a dispersion element 40 in the beam path for spectral detection, and the lower (spectral) detection channel has a Nikon 60× TIRF lens (NA 1.49). Using a long working distance objective in the upper channel relaxes the requirements on the sample thickness even for demanding, high-resolution imaging studies.

A third exemplary configuration for constructing the MSSRM in accordance with the present invention is to utilize the multiple image ports 60, 62 already existing in nearly all commercial microscope frames, FIGS. 12C, 13C. For example, the Nikon Ti-U microscope has an image port 60 on the left, the right 62, and at the front of the microscope. An internal optical path selector, operated through a multipositional knob on the outside of the microscope body, is used to divert the signal to a different image port or even a combination of multiple ports. On the Nikon Ti-U, the signal can be split between the left and right ports 60, 62 at 100:0, 0:100, and 20:80 or 80:20 ratios. This allows the MSSRM to be constructed with one channel on the left and the other on the right (FIGS. 12C, 13C), where the two channels can operate independently similarly to a dual-objective setup.

Figure 2A:
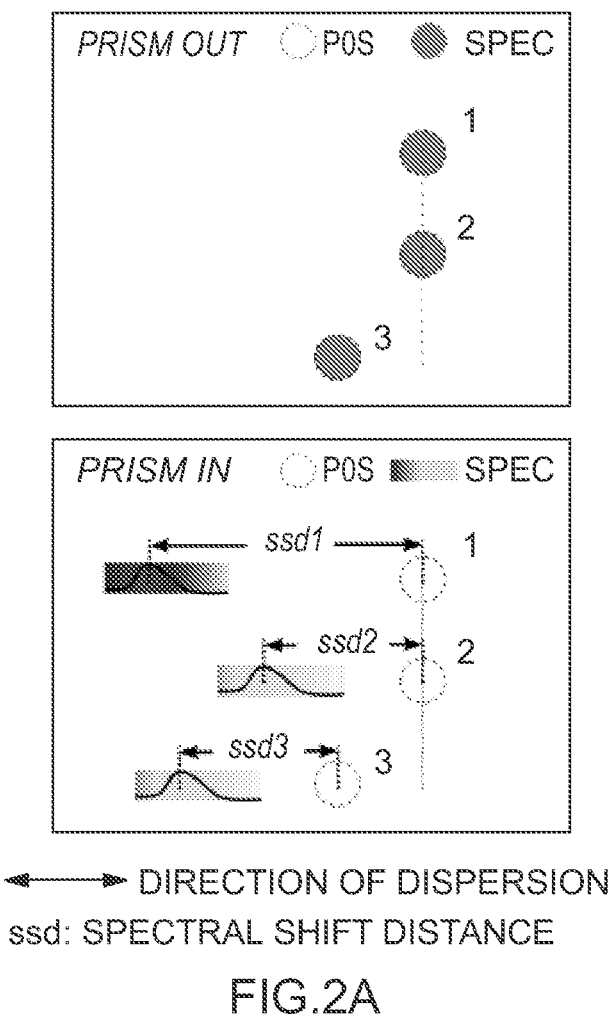
FIG. 2A schematically illustrates an exemplary configuration of a principle of spectral measurement on the MSSRM in accordance with the present invention. The positional (empty circle with dashed outline) and spectral (filled circle) images may first be aligned with high precision before the prism is inserted (top panel). Next, with the prism inserted, the spectral images of all fluorescent objects become elongated, and the intensity profile of each elongated image represents the emission spectrum of the corresponding object (lower panel). For each object in the overlaid image, its spectral shift distance (ssd) is defined as the distance between the centroid of its positional image and the sub-pixel position of maximum emission intensity in the spectral image. In this case, objects 2 and 3 may be the same type of fluorophore and exhibit the same ssd (i.e., ssd2=ssd3) values, and object 1 of a different color also has a different ssd value (ssd1). This relationship of ssd between positional and spectral data applies to all configurations that generate 1 positional and 1 spectral image, cf.

The MSSRM configured as in FIGS. 12A-12C generates two images at once for each fluorescent object in the field of view—a positional image and a spectral image. With the dispersion unit out, the two images are almost identical, and all the spectral components are focused to the same diffraction limited spot on the detector (FIG. 2A, top). With the dispersion unit in, the spectral image of each object becomes elongated in one direction—the direction of dispersion—and the intensity profile of this image bears the emission spectrum of the object. Each wavelength component in the signal from an object is deflected at a distinct angle by the prism and projected onto the detector at a specific distance away from the original, undeflected spectral image; the distance at maximum emission intensity is defined as the spectral shift distance (ssd) for the object. Hence, for each fluorescent object, the ssd corresponds to its maximum emission wavelength ($\lambda_{em}$). In practice, the ssd for an object is measured as the distance between the centroids of its positional and spectral images in the overlaid image (FIG. 2A, bottom).

Figure 2B:
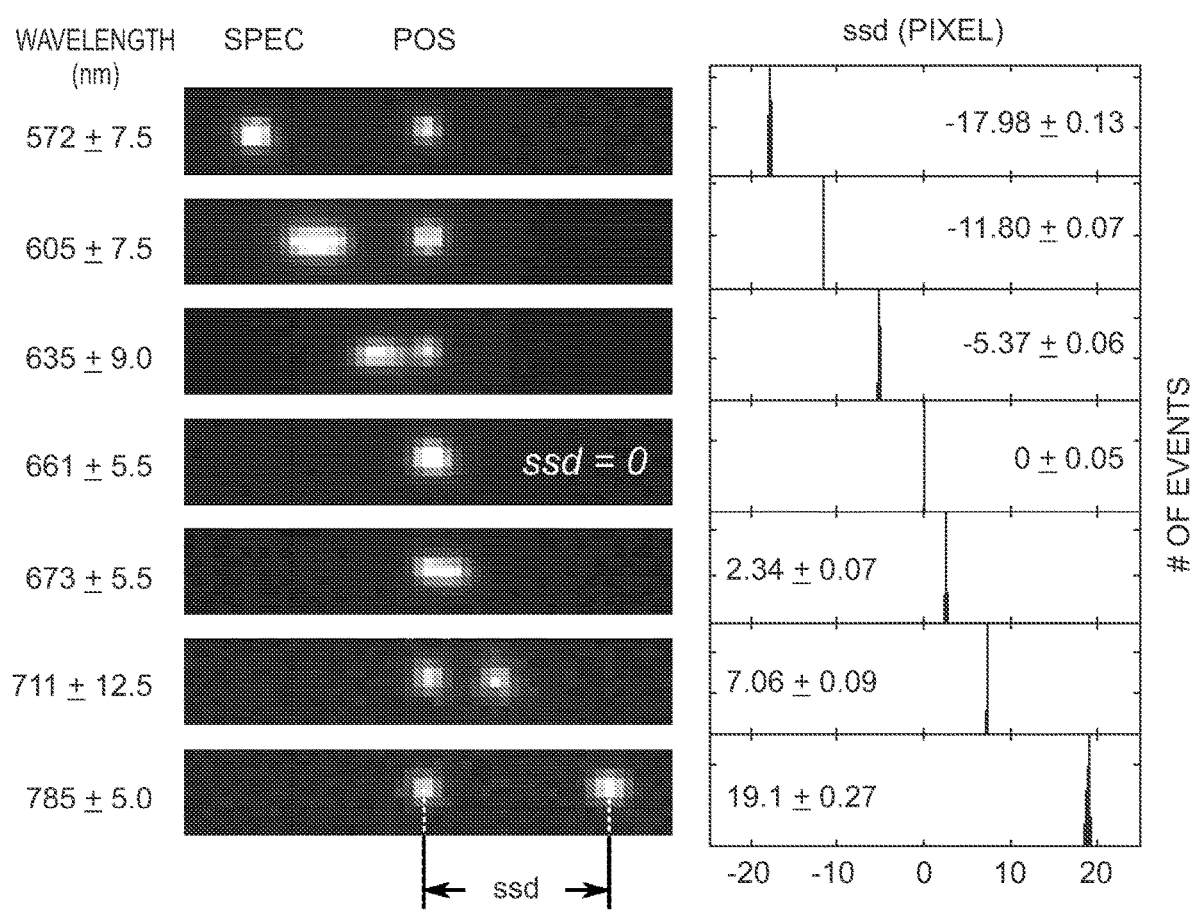
FIG. 2B illustrates overlaid positional (central spots, "pos") and spectral images of fluorescent beads (broad emission between 500 and 800 nm when excited at 488 nm) after passing through a series of narrow bandpass filters as indicated. We chose to overlap the positional and spectral images at 661±5.5 nm (i.e., ssd=0.0). Images acquired at wavelengths less than 661±5.5 have negative ssd with the spectral image to the left of the positional image, and the opposite shown in images taken at longer wavelengths. Shown on the right panel are histograms of ssd at each wavelength with the means and standard deviations indicated.

The MSSRM shown in FIGS. 1A, 12A-12C can be calibrated in two steps—channel registration and ssd to wavelength mapping. Both of these may be accomplished by imaging 40 nm fluorescent beads that emit broadly at 550 to 800 nm when excited at 488 nm. Specific wavelength ranges were selected by inserting appropriate bandpass filters in the infinity space. These filters have narrow (10-20 nm) transmission bandwidths, yielding much less elongated and symmetric spectral images to facilitate both alignment and centroid determination (FIGS. 2B, 12D). Channel registration may be performed at 661 nm by using a 661±5.5 nm bandpass filter, at which images in both channels appear round (FIG. 2B, left panel). This allows precise alignment between the two channels by adjusting the pair of mirrors in the prism assembly, FIGS. 1A, 14A. While images in the two channels overlap very well at the center of the field of view, the overlap gradually deteriorates towards the periphery; this is because light from a peripheral object enters the prism at a different angle than that from a center object, resulting in a slightly different imaging geometry. This can be corrected by computing a registration matrix between the two images, which reduced the registration error to only ~0.05 pixel across the whole field of view. As such, the ssd is set to be 0 (±0.05) pixel for objects emitting at 661 nm on the MSSRM (FIG. 2B, right panel). A 'center' wavelength of 661 nm was chosen because it is roughly at the midpoint of emission wavelength range for commonly used SMLM fluorophores (~520 to ~800 nm).

Figure 2C:
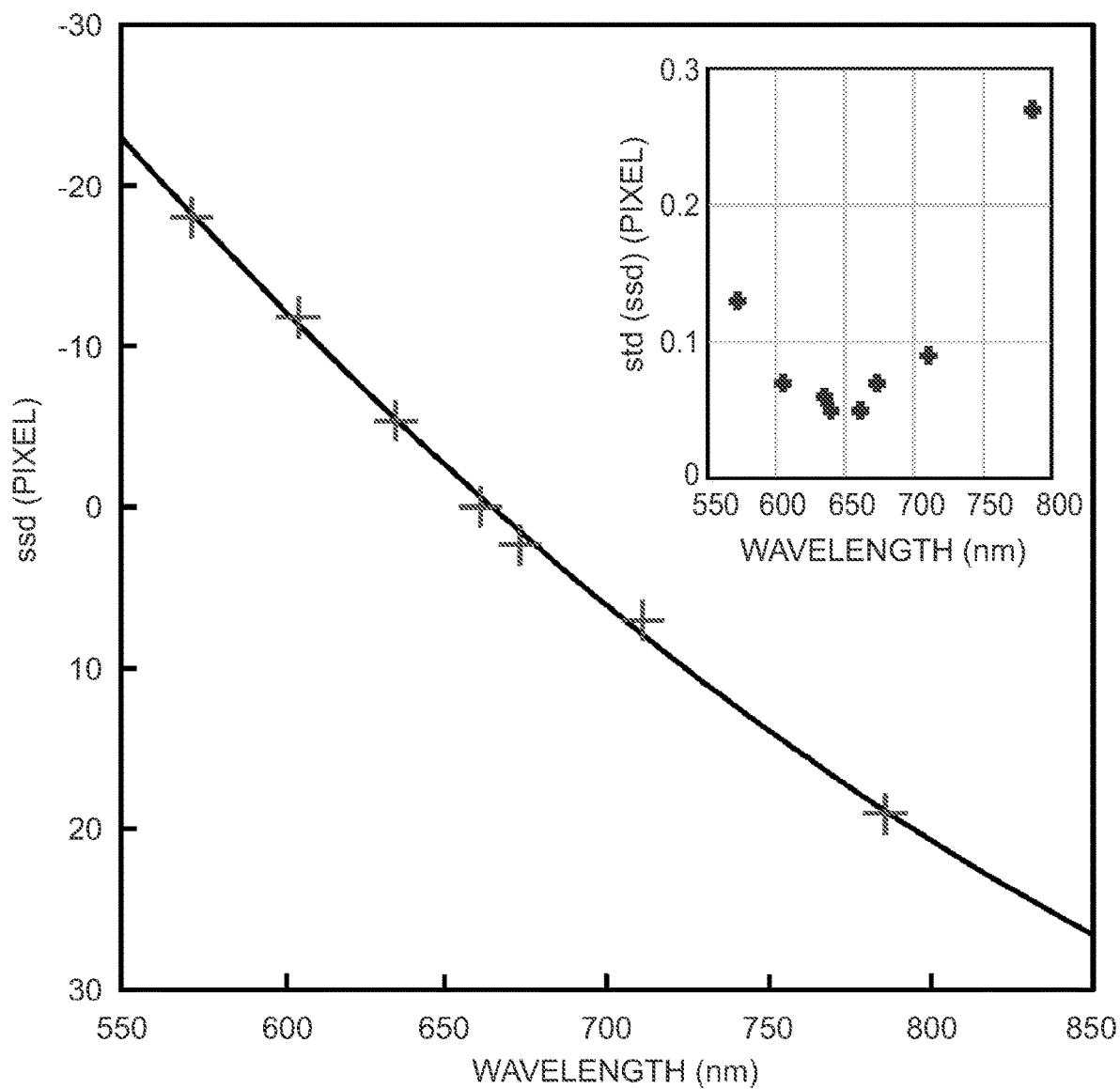
FIG. 2C illustrates a calibration curve showing the relationship between the center wavelength and the measured ssd values. The inset shows the standard deviation of the ssd at each wavelength.

With the above completed, ssd values for other wavelengths can be similarly obtained by using six different bandpass filters with center transmission wavelengths ranging from 572 to 785 nm (FIG. 2B). At each wavelength, ssd values of thousands of beads were measured to calculate the mean and standard deviations (FIG. 2B, right panel). ssd values at wavelengths shorter than 661 nm were designated as 'negative' and those at longer wavelengths designated as 'positive'. This series of measurements yielded a calibration curve for mapping ssd to wavelength (FIG. 2C). It can be estimated from the calibration curve that each pixel in the spectral image corresponds to ~5.8 nm in wavelength units, although this value depended somewhat on the wavelength. A second-order polynomial fit to the calibration curve was used to convert measured emission spectra from pixel to wavelength units. Notably, the standard deviations of ssd were typical around 0.1 pixel or less (except for the last data point where signal is limited (FIG. 2B and inset in FIG. 2C), indicating that the inherent spectral precision of this MSSRM setup should be better than 0.6 nm.

The MSSRM can also be configured with both detection paths used for spectral detection, which can take the form of a single-objective setup with an external beam splitter 30 (FIG. 13A), a dual-objective setup (FIG. 13B), or a single-objective setup with signals split between two different imaging ports 60, 62 of the microscopy body (FIG. 13C). In these configurations, the two channels both use a dispersion element 40, 42 and generate a spectral image that is elongated and shifted relative to the true position (i.e., positional image) of the fluorescent object. To be useful for determining the position and spectrum of a fluorescent object, dispersions in the two channels need to be in different directions, either in opposite directions (FIGS. 13D, 13E) or perpendicular to each other (FIGS. 13F, 13G). Alignment of these setups involve a similar procedure as described earlier. Specifically, the two channels are first aligned without the dispersion elements 40, 42. Next, one channel is converted to a spectral channel and the alignment of the dispersive unit is adjusted such that images in the two channels overlap at a defined 'center' wavelength (e.g. 661 nm as described earlier) where ssd is 0. Next, the second channel is converted to a spectral channel and the two channels are aligned also in the presence of the same narrow band pass filter). As such, the two spectral channels will be aligned with the positional image as the common reference with the same amount of dispersion in the two channels.

Calibration of MSSRM setups with two spectral channels is also similar to the procedure described for the configurations with a positional and a spectral channel (FIGS. 1A, 12A-12C), with the only difference being that now each channel will yield a spectrum of the same molecule and will have its own ssd—although theoretically the two ssd values should be equal. In practice, the two spectra and the two ssd values may be slightly different but can be averaged to yield a smoother spectrum of the molecule and a more accurate ssd.

An additional calibration setup for the setups with two spectral channels is the calculation of the molecule position based on the two spectral images (FIGS. 13D-13G). When the two spectral images are in opposite directions, for example both along the x axis, the x position of the molecule expressed as the pixel position in the image can be calculated as the midpoint in the x direction of the two spectral images. The two spectral images along the x axis yield a 1-dimensional intensity profile along the y axis, which can then be fitted with a 1-dimensional Gaussian function to find the center y position (FIG. 13E). When the two spectral images are perpendicular to each other, the particle position can simply be determined by collapsing each image in the dispersion direction to calculate the center position in the other axis (FIG. 13G). Alternatively, in both cases, the particle position can be determined as the position at which the two spectra appear identical (or the most similar to each other); this approach is likely more precise but also more computationally expensive.

Multicolor single-molecule localization microscopy with the MSSRM. The ability to measure single-molecule positions and spectra in parallel enables multicolor localization microscopy without having to use emission filters. Specifically, although the emission spectrum of a fluorescent molecule can be broad (50-100 nm), its $\lambda_{em}$ (or ssd) can be determined with much better precision. In the case of positional determination, the accuracy in determining $\lambda_{em}$ or ssd depends on the number of photons collected from the molecule (Thompson R E et al, Biophys J 82, 2775-2783 (2002); incorporated by reference herein). Additionally, individual molecules of the same fluorophore can exhibit somewhat variable $\lambda_{em}$ manifested as a broadened distribution of ssd. The narrower the distribution of single-molecule ssd, the less spectral separation is needed between two fluorophores to reliably distinguish them, and the more colors could be imaged simultaneously within the same sample. Hence, ideal fluorophores for the MSSRM should be bright and spectrally homogeneous, both of which help to reduce the standard deviation of ssd, additionally to meeting the requirements for SMLM such as complete photoswitching and low duty cycle (probability of a fluorophore being in its on state).

A large number of fluorophores were tested for their performance on the MSSRM. Examples of these are listed in FIG. 7. Many of the listed fluorophores have also been previously tested for SMLM (Lehmann M et al, J Biophotonics 9, 161-170 (2016); incorporated by reference herein) or SR-STORM. Notably, performance of SMLM-ready fluorophores varies greatly on the MSSRM. For instance, Alexa Fluor 647 (AF647), one of the best fluorophores for SMLM, has a very small standard deviation of single-molecule $\lambda_{em}$ (~2.7 nm) and therefore would be predicted to be an excellent MSSRM fluorophore as well. By contrast, DY703 performs well for SMLM but shows much greater fluctuation in $\lambda_{em}$ (~11 nm), making it suboptimal for the MSSRM. A few other fluorophores even showed unexpected large shifts in $\lambda_{em}$; for example, the $\lambda_{em}$ of Atto 725 shifted from ~750 nm (bulk) to ~680 nm (MSSRM) and thus the fluorophore is unlikely to be useful for MSSRM or even current SMLM.

Four fluorophores, namely the Dyomics 634 (DY634), DyLight 650 (DL650), CF660C, and CF680, were previously used for a 4-color SR-STORM. These fluorophores also performed well on the MSSRM, showing efficient photoswitching and high photon yields (on average >1,000 photons in the positional channel alone). The $\lambda_{em}$ values measured on the MSSRM are 662.8±3.5, 680.5±4.0, 696.8+4.2, and 711.9+2.9 nm (mean±sd). On average there is a ~15 nm separation between the fluorophores, so these fluorophores should be well separated on the MSSRM (FIG. 3A). Notably, these four fluorophores were only ~10 nm apart spectrally on the SR-STORM. This discrepancy may arise from differences in spectral calibration between SR-STORM and the MSSRM. Note that the $\lambda_{em}$ values measured on the MSSRM are much closer to the bulk properties compared to those measured on the SR-STORM (FIG. 7).

MSSRM images of U2OS cells simultaneously stained with the four fluorophores labeling vimentin (DY634), mitochondria (DL650), microtubule (CF660C), and the plasma membrane (CF680) clearly showed four distinct structures with excellent spatial resolution and spectral separation. Clean single-molecules images with robust photoswitching were recorded from these samples, and the four fluorophores could even be visually distinguished from each other in overlaid spectral and positional images (FIG. 3B). Histograms of ssd for all single molecules detected comprise four well separated peaks, corresponding to the 4 fluorophores (FIG. 8). The histograms are then fitted with four Gaussian distributions, each of which has a mean and standard deviation that largely agrees with the single-color results. Based on the fitting results, an empirical ssd range can be defined for each fluorophore, and events outside of the defined ranges—particularly those that fall in the boundaries between neighboring peaks—are discarded. By adjusting the ssd ranges, the crosstalk (i.e., false assignment rate) between neighboring fluorophores can be set at ~1%, when typically ~20% events are discarded (FIG. 8). This leaves a sufficient number of localization events to reconstruct a high-resolution image in each of the four channels with very low spectral crosstalk (FIG. 3C, FIG. 8). Even lower spectral crosstalk could be achieved by further narrowing the ssd ranges at the cost of more discarded localization events and potentially fewer continuous structures.

In another test, microtubules in U2OS cells were labeled with AF647 via indirect immunofluorescence. The sample was imaged on the MSSRM using standard STORM imaging buffer and acquisition settings. Similar settings were used in data processing (in particular, the same threshold for picking up single particles) as in conventional STORM. The reconstructed image (FIG. 9) clearly shows the hollow structure of microtubules, a commonly used standard for assessing imaging resolution of STORM. The measured widths of the microtubules were ~39 nm, also comparable to other reported measurements (Ries J et al, Nat Methods 9, 582-584 (2012); incorporated by reference herein) and is consistent with an average spatial resolution of ~25 nm.

Multicolor single-molecule tracking (SMT) in live cells with the MSSRM. The use of a single-objective configuration in MSSRM frees up space above the sample, permitting flexible sample mounting on commercial, inverted microscope frames for both fixed and live cell imaging. In particular, living cells can now be maintained under physiological conditions for extended periods of time in an on-stage incubator with both temperature and $CO_2$ control. This makes the MSSRM fully compatible with live cell single-molecule localization and tracking, the latter of which is described herein.

Conventional instead of photoswitchable fluorophores were selected for multicolor SMT in live cells. Use of conventional fluorophores eliminates the need for STORM imaging buffers and high power laser illumination, both of which could be detrimental to living cells. Additionally, rather than densely labeling the sample as typically done in SMLM, a sparse labeling strategy was used. In such a strategy, low concentrations (0.5-5 nM) of fluorescently labeled affinity reagents were kept in the growth medium throughout the imaging experiment, so that binding of new fluorescent probes to cellular targets replenishes probes lost to photobleaching.

The performance of MSSRM for SMT in live U2OS cells labeled with several cell surface targets was assessed. Specifically glycoproteins with wheat germ agglutinin (WGA) conjugated to CF633, transferrin receptors labeled using human transferrin (HT) conjugated to CF680R, and the CellMask-DeepRed™ (CellMask DR™) reagent (a fluorophore coupled to a lipid-soluble membrane anchor) were visualized. CF633, Cellmask-DR™ and CF680R can be efficiently excited with a single 637 nm laser, and all three exhibit excellent photostability. Single-molecule spectral characteristics were assessed. The characteristics included the average emission spectra, the mean ssd, and the standard deviations of ssd for each of CF633, Cellmask-DR™, and CF680R in single-color live cell imaging experiments. Results are shown in FIG. 4A. The measured ssd values for CF633, Cellmask-DR™ and CF680R in the current conjugated forms were 0.2±0.5, 2.9±0.9, and 8.1±0.9, which correspond to $\lambda_{em}$ at 662.3±2.8, 677.6±5.2, and 708.9±5.5 nm, respectively. Importantly, single-molecule MSSRM spectra do not appear to be smeared by molecular motions (FIG. 4B). This is because the motions cause the same displacement in both the positional and spectral images and the ssd is measured as a relative distance between the two images. A frame acquisition time of 20-30 ms and a laser power density of 0.5-1 kW/cm$^2$ were observed. These were significantly lower than frame acquisition times and laser power densities typically needed for photoswitchable dyes. These flurophores therefore offer a good compromise between trajectory length, temporal resolution, and spectral resolution. Further improvement in fluorophore photostability and trajectory length can be made by adding the 'Prolong Live Antifade' reagent specially formulated for live cell imaging (see below).

The movements of the three fluorophore-labeled cell surface targets were first measured individually. Visual inspection of videos showing such movement suggested that both protein-coupled fluorophores can undergo fast movement along linear tracks indicative of directed transport following endocytic uptake. CellMask DR was seen to make much larger excursions per frame on average than the other two fluorophores, but the motions did not indicate active transport. Consistent with the visual inspections, analysis using variational Bayesian single-particle tracking (vbSPT) showed that WGA-CF633 exhibited distinct rapid and slow movement patterns: one characterized by a diffusion constant (D) of ~0.36 µm$^2$/s, and the other characterized by a diffusion constant ~0.01 µm$^2$/s. HT-680R consistently displayed three movement patterns characterized by diffusion constants of 0.02, 0.09, and 0.39 µm$^2$/s. As expected for a small molecule probe, CellMask DR was characterized mostly by a seemingly random movement pattern associated with a diffusion constant of ~0.62 µm$^2$/s. A small fraction of the molecules exhibit slowed diffusion (D~0.07 µm$^2$/s), but unlike WGA or HT, CellMask DR does not become completely immobile (D~0.01 µm$^2$/s) (FIGS. 10A and 10B).

Simultaneous imaging of all the targets was performed using the MSSRM. Cells were labeled and imaged under conditions identical to that used for single-color experiments, except that all three labeling reagents were included. Clear images of single-molecules were recorded at 20-30 ms/frame. In overlaid positional and spectra images, the three molecular species could be visually detected based on the relative pixel locations of the two images (FIG. 4C, upper panel), similarly to that shown in FIG. 3C. Consistently, the histograms of ssd values for all detected localization events showed three distinct peaks, each of which was assigned to a specific fluorophore (FIG. 4C, lower panel).

After fluorophore assignment, single-molecule localization events were separated into three channels based on emission spectra, and the localizations were connected into trajectories based on spatial proximity in successive frames (FIG. 4D). As such, diffusion properties of all three species could be extracted from a single experiment. FIGS. 5A and 5B display histograms of displacement per frame and vbSPT analysis of diffusion states, respectively, for each species. In both cases, results from multicolor tracking were very similar to the single-color control experiments in terms of diffusion constants, although the relative populations of each diffusion state appear to fluctuate from cell to cell (FIGS. 10A and 10B). Apparently, the MSSRM and the associated algorithms were able to correctly identify the individual fluorophores and extract the unique diffusion properties of each species. These results validate the use of MSSRM for simultaneous tracking of multiple targets in live cells at the single-molecule level.

It is disclosed herein that multicolor spatial and spectral imaging using single-molecule localization principles can be achieved using the single objective MSSRM—a simple to use, epi-illumination system that is well suited to live cell imaging. The MSSRM records paired positional-spectral or spectral-spectral images for each fluorescent molecule in the on state, where the location of the fluorescent molecule is either recorded in the positional image (FIGS. 2A, 2B, 12D) or determined by combining the two spectral images (FIGS. 13D, 13E), and the spectral image or a pair of spectral images is used to determine fluorophore identity (i.e. 'color'). Given suitable fluorophores, the MSSRM achieves far better spectral resolution at 10-15 nm compared with 'conventional' SMLM (50-100 nm) without compromising spatial resolution. With the current spectral resolution, the MSSRM can potentially image samples in up to 20 different colors, provided that a panel of optimized fluorophores are available and that 20-color sample labeling can be accomplished. Mlodzianoski et al reported a single objective spectral SMLM in a somewhat different configuration (Mlodzianoski M J et al, PLoS One 11 e0147506 (2016); incorporated by reference herein).

The MSSRM can make use of fluorophores with broad emission and significant spectral overlap as long as the ssd of each does not vary substantially between individual fluorophores and/or as a result of exposure to different chemical environments within the cell. The fluorophores used in this study for both fixed and live cell experiments satisfy these criteria; their ssd values typically fluctuate within a small range, and the shapes of the single-molecule spectra are mostly invariant across the sample (this work and Zhang 2015 supra), even when the molecules are moving (FIG. 4B). Although herein, ssd values were used to distinguish fluorophores, other spectral properties such as the shape of the emission spectra can also be used in fluorophore identification to further improve spectral resolution. In addition, MSSRM can be used with environment-sensitive fluorophores (Klymchenko A S & Mely Y, Prog Mol Biol Transl Sci 113, 35-58 (2013); incorporated by reference herein) to assess heterogeneities in the micro- and nano-environment.

Multicolor localization and tracking with the MSSRM can use fluorophores that emit at similar wavelengths, such as within ~15 nm. This allows the use of a single laser to efficiently excite multiple fluorophores at once, greatly simplifying the experiment and image registration as well as reducing the total laser power and the associated phototoxic effects that can be detrimental to live cell imaging experiments (Frigault M M et al, J Cell Sci 122, 753-767 (2009); incorporated by reference herein.) Intermediate filaments, mitochondria, microtubules, and the membrane can be separately visualized when labeled with targeting molecules conjugated to DY634, DL650, CF660C, and CF680. The $\lambda_{em}$ for these four fluorophores are only ~15 nm apart and yet they could be distinguished with high accuracy using the disclosed methods. The rate of fluorophore mis-classification (i.e., spectral crosstalk) is targeted at 1-2% during image processing. Such crosstalk can be further reduced by adopting a more stringent assignment strategy but this would come at the expense of discarding more localization events.

MSSRM imaging eliminates the need for image registration among the multiple 'color' channels. Conventional approaches to multicolor imaging involve switching filters or light paths, so that images from different channels must be aligned during post-processing. In MSSRM (and SR-STORM), all molecular positions regardless of color are recorded through the same optics and on the same detector. "Color" is assigned computationally based on the spectral characteristics of each fluorophore so no registration is needed. Residual registration error may originate from lateral chromatic aberrations of the optics (including the objective lens 10) but it should be minimal (FIG. 11). Image registration can be used if multiple dichroic mirrors are used in experiments involving multiple laser lines.

A key benefit of using a single-objective configuration in the MSSRM is the full compatibility with live cell imaging. By avoiding the use of two opposing objectives, the upright space is freed for environmental incubators to maintain cells under physiological conditions, and chambered slides instead of sandwiched coverslips can be used for both live and fixed cell imaging. 3-color SMT was demonstrated in live cells using spectrally similar dyes (CF633, CellMask DR, and CF680R) that are separated by 20-30 nm spectrally and can be excited by a single, 637 nm laser. A recent work by English et al. implemented 3-color SMT using 3 lasers and 3 cameras (English B P & Singer R H, Proc SPIE Int Soc Opt Eng 9550, 955008 (2015); incorporated by reference herein), which should be readily achievable using the MSSRM. SMT in even more colors should be possible with an appropriate panel of fluorophores, given the remaining spectral space (FIG. 4C). The diffusion properties derived from a simultaneous 3-color tracking experiment agreed very well with the single-color controls, confirming accurate assignment of fluorophores in a sample with mixed staining. In this example, the apparent spectral resolution was 20-25 nm, which is lower than that achieved in fixed cell imaging experiments; this is mostly due to the larger spectral fluctuations of CellMask DR (FIGS. 4A, 4C).

The MSSRM system can be extended to 10-20 color, ~20 nm resolution imaging by adding additional laser lines (such as 561 and 488 nm) and by identifying suitable fluorophores that can be excited by each laser. This can result in the analysis of the spatial organization of multiprotein complexes that mediate essentially all biological process. Numerous studies have demonstrated the use of SMT data to probe the diffusional states of target molecules and to define the state conversion kinetics (Persson F et al, Nat Methods 10, 265-269 (2013) and Kusumi A et al, Nat Chem Biol 10, 524-532 (2014); both of which are incorporated by reference herein), from which transient interaction and spatial partitioning events could be inferred. In particular, presence of molecular states that are almost completely immobile (such as those of WGA-CF633 and HT-CF680R shown in FIGS. 4D, 5A, 5B) often indicates localization to nanodomains (such as 'lipid rafts') or interaction with cellular scaffolds (Dietrich C et al, Biophys J 82, 274-284 (2002) and Katz Z B et al, Elife 5, 10415 (2016); both of which are incorporated by reference herein), an increasingly appreciated mechanism of biological regulation. Simultaneous multicolor SMT is a powerful technique for capturing the dynamic colocalization of multiple molecules in distinct cellular compartments, which would be difficult in snapshots of static images.

Microscopy. The MSSRM microscope show in FIG. 1A was constructed with a similar illumination path to that described in Nickerson A et al, PLoS One 9, e100589 (2014), which is incorporated by reference herein. Briefly, lasers emitting at 405 (Coherent OBIS 405, 100 mW), 561 (Coherent Sapphire 561, 150 mW), and 637 nm (Coherent OBIS 637, 140 mW), respectively, were combined and introduced to the back of a Nikon Ti-U microscope equipped with a 60× TIRF objective (Nikon, NA 1.49). The illumination can be continuously tuned between epi-fluorescence and strict TIRF modes by shifting the incident laser horizontally with a translational stage before entering the microscope. For the MSSRM, single edge dichroic mirrors Di02-R561 and LPD02-633RU were used to reflect the laser into the objective 10 and clean up fluorescence signals from the sample; these dichroic mirrors also reflect 405 nm light needed for photoactivation and photoswitching. A short pass filter (Semrock, BLP-633R) was placed in front of the 637 nm laser to clean up the output. The OBIS 637 laser was set to operate at 11° C. to bring the center wavelength down to ~635 nm in order to work with the above filters.

Fluorescence signals were collected at the side-port of the microscope, with a slit 20 (Thorlabs, VA100) at the intermediate image plane to narrow the field of view. An infinity space was created by placing a triplet lens (Newport, PAC076, f=125 mm) at the Fourier plane of the intermediate image. A filter wheel was mounted in the infinity space right after the beam splitter 30 to position emission and/or notch filters in order to provide signal cleanup and to specify detection wavelength range. A nonpolarizing beam splitter 30 (Thorlabs, BS022) was inserted after the filter mount to divide the signal into positional (30%, transmitted) and spectral (70%, reflected) channels. The signal in each channel was re-focused with another triplet lens (f=125 mm) before the two channels were combined using a knife-edge mirror 50 (Thorlabs, MRAK25-E02) and projected onto the left and right halves of the same EM-CCD (Andor, iXon Ultra 897). To disperse fluorescence signals in the spectral channel, an equilateral prism (Thorlabs, PS863) was placed after the beam splitter 30 and at the Fourier plane of the last focusing (triplet) lens. Two steering mirrors were used to bring the light path back to the original direction (i.e., in the absence of the prism). The prism and two steering mirrors were mounted vertically on a translational stage, and the whole assembly can be moved in and out of the light path to facilitate alignment. An effective pixel size of 178 nm was used in both channels.

Spectral calibration of the MSSRM was performed by imaging 40 nm fluorescent beads (Life Technologies, F8793). Narrow bandpass filters were inserted in the infinity space below the objective 10 to specify the wavelength range of signals to reach the detectors. This results in a relatively narrow image in the spectral channel to allow for calculation of the distance between the precise centroid positions of each molecule in the two channels. The bandpass filters used for this purpose are all from Semrock with part numbers FF01-572/15, FF01-605/15, FF01-635/18, FF01-661/11, FF01-673/11, FF01-711/25, and LD01-785/10. Of these, the FF01-661/11 filter was used to overlap the positional and spectral images; the same filter is also used prior and after each MSSRM imaging session to ensure alignment between the two channels and to obtain a registration matrix specific for the session.

Tissue culture. U2OS cells (human osteosarcoma, ATCC, HTB-96) were maintained at 37° C. and under 5% $CO_2$ in DMEM supplemented with 10% FBS (Life technologies, 11995 and 10082 respectively). For imaging, LabTek (Thermo, 155409) or µ-Slide (ibidi, 80827) chambers with a #1.5 coverglass bottom were first cleaned by incubating with 1 M NaOH for 2 hours at room temperature, followed by washing 5 times with MilliQ water and incubation with MilliQ water or PBS overnight. Cells were plated in the chambers 36-48 hours prior to imaging in phenol red-free DMEM (Life technologies, 21063) supplemented with 10% FBS.

Fluorescence labeling and MSSRM imaging of fixed cells. For immunostaining of U2OS cells, the cells were briefly washed with PBS before fixation in a PBS buffer containing 3.7% paraformaldehyde and 0.05% glutaraldehyde. The cells were then incubated with WGA-CF680 (Biotium, 29029, 1:100 dilution in PBS) for 20 min, followed by washing 3×5 min with PBS. The cells were then permeabilized and blocked in the dilution buffer (PBS with 3% BSA and 0.05% Triton X-100) for 30 min. Next, the cells were incubated with primary antibodies in the dilution buffer for 1 hr. After thorough washing (3×5 min) with PBS, the cells were incubated with secondary antibodies in the dilution buffer for 45 min then washed again in PBS for 3×5 min and stored in PBS until imaging. The primary antibodies used are rabbit anti-Tom20 (Abeam, 78547, 1:500 dilution), chicken anti-vimentin (EMD Millipore, AB5733, 1:5,000 dilution), rat anti-α-tubulin (Thermo, MA1-80017, at 1:2,000 dilution). The secondary antibodies used are donkey anti-rabbit (JacksonLabs, 711-005-152), goat anti-chicken (Thermo, SA5-10073) and donkey anti-rat (JacksonLabs, 712-006-150) conjugated to DY634 (Dyomics), DL650 (Thermo), CF660C (Biotium), respectively, using manufacturer recommended procedures. The dye to antibody ratio was between 2 and 4 for each antibody. Exact dilutions of dye conjugated secondary antibodies were optimized batch-to-batch.

MSSRM imaging of fluorescently stained cells was performed in PBS buffer supplemented with ~100 mM mercaptoethylamine (MEA, Sigma, 30070) or 1-2% β-mercaptoethanol (BME), 5 ug/mL glucose oxidase (Sigma, G2133-50 kU), 0.4 ug/mL catalase (Sigma, C100-50 MG), and 10% glucose (w/v, Fisher Chemicals D16-500). For all fixed cell imaging experiments, the EM-CCD was operated in frame transfer mode at 10-15 milliseconds per frame acquisition time with an EM gain setting around 300. Additionally, only the center 512×200 pixels (i.e., the positional and spectral channels each occupy a region of 256×200 pixels) were used for recording raw images.

Live cell single-molecule tracking (SMT). Cells were cultured using procedures described earlier. Two hours before imaging, the growth medium was replaced with Fluorobrite DMEM (Thermo, A18967) supplemented with 10% FBS and 1:100 (v/v) ProLong Live Antifade Reagent (Thermo, P36975). Live cell SMT experiments were performed at 37° C. and 5% $CO_2$ using a temperature- and $CO_2$-controlled sample stage (Tokai Hit, INUG2F-SSI-W and UNIV2-CSG) connected to a house $CO_2$ line. After the temperature and $CO_2$ level stabilizes, fluorescent labeling reagents were added to the well of interest by pipetting. WGA-CF633 (Biotium, 29024) and human transferrin-CF680R (Biotium, 00086) were added to a final concentration in the range of 0.25-1 nM, while CellMask Deep Red (Life Technologies, C10046) was added to a final concentration of 1 to $4×10^{-4}$ [X], where [X] is the concentration recommended by the manufacturer for sample staining. The sample was incubated for an additional 5 minutes to allow the fluorescent molecules to bind to the cell membrane and the temperature and $CO_2$ level to stabilize. Sample illumination and signal detection were performed in the same manner as described above for fixed cells. Typically 10,000-30,000 frames were recorded at 20-30 frames per second.

Data acquisition and analysis. Acquisition of raw images was performed using the open source micromanager software suite (https://micro-manager.org/) (Edelstein A et al, Curr Prot Mol Biol Ch 14, Unit 14 (2010); incorporated by reference herein). Image analyses for extracting single-molecule localization, spectra, and trajectories were all performed with custom MatLab (Mathworks, Mass.) scripts as described previously (Nickerson A et al, J Vis Exp e531554 (2015); incorporated by reference herein).

For spectral analysis, individual molecules were first identified in the positional channel, and a corresponding 'center' position for each molecule in the spectral channel was computed based on a transformation matrix, which was determined by registering positional and spectral images of gold fiduciaries on the coverslip taken with the 661±5.5 nm bandpass filter. For each molecule, a 51 (rounded center position±25 along the dispersion direction) pixel×3 (orthogonal direction) pixel region in the spectral image was used as its raw spectrum. The raw spectrum was first smoothed by moving average to locate the pixel with maximum intensity. Next, the precise pixel position of maximum emission was calculated by using a second-order polynomial fitting of pixels surrounding the one with maximum intensity; this is used to calculate ssd. For multicolor data, coordinates of each fluorophore were first separated based on ssd values as described in the text; each channel was then rendered separately and recombined in ImageJ (https://imagej.nih.gov/ij/) (Schindelin J et al, Nat Meth 9, 676-682 (2012); incorporated by reference herein) into a composite image.

For trajectory analyses, two molecules in adjacent frames were connected into a trajectory if they were located within 500 nm (i.e., ~3 pixels on the EM-CCD) of each other for data taken at 50 fps, and adjusted accordingly for data taken at slower rates. This could be performed before or after separating the coordinates into individual colors. Of note, molecules often fluctuate in brightness during diffusion; hence some frames within a trajectory might contain noisier spectra than others. To avoid having to discard the entire trajectory due to these noisy spectra, spectral data from 2- or 3-successive frames could be combined to obtain an average spectrum. Trajectories with 'mixed' colors were discarded. This procedure resulted in much better retention rate of trajectories without adversely affecting the spectral resolution than solely using single-frame spectra for color separation. Diffusion state analysis with vbSPT was performed using the MatLab scripts.

The invention claimed is:

1. A microscope apparatus for simultaneous measurement of positional-spectral or spectral-spectral information of a sample, comprising:
   collection optics for receiving a light signal from a sample, the collection optics configured to create a first optical path having a first light signal and a second optical path having a second light signal;
   a first dispersion element disposed in the first optical path to disperse the first light signal into a first spectrum;
   a detector for receiving the spectrum from the first optical path and light from the second optical path;
   a knife-edge mirror disposed between the dispersion element and the detector, the knife-edge mirror positioned to receive the spectrum from the first optical path and light from the second optical path and to reflect the received spectrum and light to the detector; and
   a second dispersion element disposed in the second optical path to disperse light received thereby into a second spectrum.

2. The microscope apparatus according to claim 1, wherein the collection optics includes an objective lens and a beam splitter disposed between the objective lens and the dispersion element, the beam splitter configured to divide light received thereby into the first and second optical paths.

3. The microscope apparatus according to claim 2, wherein the beamsplitter is configured to divide the light into a first portion of about 70% in the first optical path and a second portion of about 30% in the second optical path.

4. The microscope apparatus according to claim 1, wherein the collection optics includes a first objective lens disposed in the first optical path for receiving a light signal from the sample, and wherein the collection optics includes a second objective lens disposed in the second optical path at a location for receiving a light signal from the sample.

5. The microscope apparatus according to claim 1, wherein the collection optics includes left and right microscope image ports.

6. The microscope apparatus according to claim 5, wherein the image ports are configured to divide the light into a first portion of about 70-80% in the first optical path and the remaining 30-20% in the second optical path.

7. The microscope apparatus according to claim 1, comprising a knife-edge mirror disposed between the first and second dispersion elements and the detector, and positioned to receive the first and second spectra and to reflect the received spectra to the detector.

8. The microscope apparatus according to claim 1, wherein the position information of the sample is determined using the spectral information received by the detector.

9. The microscope apparatus according to claim 1, wherein the first and second dispersion elements are oriented to disperse the first and second spectra in opposite directions.

10. The microscope apparatus according to claim 1, wherein the first and second dispersion elements are oriented to disperse the first and second spectra in directions that are perpendicular to one another.

11. The microscope apparatus according to claim 1, comprising a pair of lenses disposed between the collection optics and the first dispersion element, the pair of lenses placed in a 4f configuration with a slit placed at the intermediate image plane between the lenses.

12. The microscope apparatus according to claim 11, wherein the slit has a longitudinal axis and the first dispersion element is oriented to disperse the first light signal along a direction parallel to the longitudinal axis.

13. The microscope apparatus according to claim 1, wherein at least one of the first and second dispersion elements includes a prism assembly comprising an equilateral prism and at least two mirrors in optical communication with the prism.

14. The microscope apparatus according to claim 1, wherein at least one of the first and second dispersion elements is mounted to a translation stage.

15. The microscope apparatus according to claim 1, wherein at least one of the first and second dispersion elements includes a diffraction grating.

16. The microscope apparatus according claim 1, wherein at least one of the first and second dispersion elements includes a diffraction grating and at least two mirrors in optical communication with the grating.

17. A method of imaging live cells, the method comprising:
   providing a microscope apparatus according to claim 1; and
   labeling a first biomarker with a first reagent and a second biomarker with a second reagent, where the first reagent comprises a first fluorescent label and the second reagent comprises a second fluorescent label, and where the first fluorescent label and the second fluorescent label are all excitable by light of the same wavelength and emit at a wavelength distinguishable from one another.

* * * * *